US012613395B2

(12) United States Patent
Kuo

(10) Patent No.: US 12,613,395 B2
(45) Date of Patent: Apr. 28, 2026

(54) IMAGE LENS ASSEMBLY AND IMAGE APPARATUS

(71) Applicant: LARGAN PRECISION CO., LTD., Taichung City (TW)

(72) Inventor: Tzu-Chieh Kuo, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 324 days.

(21) Appl. No.: 18/454,214

(22) Filed: Aug. 23, 2023

(65) Prior Publication Data

US 2024/0069309 A1     Feb. 29, 2024

(30) Foreign Application Priority Data

Aug. 24, 2022     (TW) .................................. 111131837

(51) Int. Cl.
*G02B 9/62*        (2006.01)
*G02B 13/00*       (2006.01)
*G02B 13/06*       (2006.01)
*G02B 13/18*       (2006.01)

(52) U.S. Cl.
CPC ........... *G02B 9/62* (2013.01); *G02B 13/0045* (2013.01); *G02B 13/06* (2013.01); *G02B 13/18* (2013.01)

(58) Field of Classification Search
None
See application file for complete search history.

(56) References Cited

U.S. PATENT DOCUMENTS

| | | | |
|---|---|---|---|
| 5,691,851 A | 11/1997 | Nishio et al. | |
| 12,405,447 B2 * | 9/2025 | Chen | ........................ G02B 9/64 |
| 2012/0075717 A1 | 3/2012 | Tada | |
| 2014/0293444 A1 | 10/2014 | Abe | |
| 2015/0177482 A1 | 6/2015 | Bone et al. | |
| 2016/0178871 A1 * | 6/2016 | You | .................... G02B 13/0045 |
| | | | 359/713 |
| 2017/0059820 A1 | 3/2017 | Tang et al. | |
| 2017/0059822 A1 | 3/2017 | Tang et al. | |
| 2017/0269335 A1 | 9/2017 | Lai et al. | |
| 2017/0269336 A1 | 9/2017 | Lai et al. | |
| 2018/0188494 A1 | 7/2018 | Chang et al. | |
| 2018/0188495 A1 | 7/2018 | Chang et al. | |

(Continued)

FOREIGN PATENT DOCUMENTS

| | | |
|---|---|---|
| CN | 104614843 A | 5/2015 |
| CN | 204462509 U | 7/2015 |

(Continued)

*Primary Examiner* — Darryl J Collins
(74) *Attorney, Agent, or Firm* — McClure, Qualey & Rodack, LLP

(57)                ABSTRACT

An image lens assembly includes six lens elements, and the six lens elements are, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The first lens element with negative refractive power has the image-side surface being concave in a paraxial region thereof. The second lens element has negative refractive power. At least one surface of at least one of the six lens elements includes at least one inflection point.

20 Claims, 17 Drawing Sheets

(56)         References Cited

U.S. PATENT DOCUMENTS

| | | | |
|---|---|---|---|
| 2018/0203207 A1* | 7/2018 | Chen ................. | G02B 13/0045 |
| 2019/0170979 A1 | 6/2019 | Hsieh et al. | |
| 2020/0103615 A1 | 4/2020 | Chae et al. | |
| 2021/0018724 A1* | 1/2021 | Hsu ..................... | G02B 13/004 |
| 2021/0364744 A1* | 11/2021 | Wang ................... | G02B 13/18 |
| 2023/0161138 A1* | 5/2023 | Lee ................... | G02B 13/0045 |
| | | | 359/708 |

FOREIGN PATENT DOCUMENTS

| | | | |
|---|---|---|---|
| CN | 110308542 A | 10/2019 | |
| CN | 210666171 U | 6/2020 | |
| CN | 111650723 A | 9/2020 | |
| CN | 111650725 A | 9/2020 | |
| CN | 111708150 A | 9/2020 | |
| CN | 111929810 A | 11/2020 | |
| CN | 111999863 A | 11/2020 | |
| CN | 112444938 A | 3/2021 | |
| CN | 213544925 U | 6/2021 | |
| CN | 114755808 A | 7/2022 | |
| CN | 217085397 U | 7/2022 | |
| JP | 2017-102211 A | 6/2017 | |
| TW | I775657 B | 8/2022 | |

* cited by examiner

IMAGE LENS ASSEMBLY AND IMAGE APPARATUS

RELATED APPLICATIONS

This application claims priority to Taiwan Application Serial Number 111131837, filed Aug. 24, 2022, which is herein incorporated by reference.

BACKGROUND

Technical Field

The present disclosure relates to an image lens assembly and an image apparatus. More particularly, the present disclosure relates to an image lens assembly and an image apparatus that are arranged with a wide field.

Description of Related Art

With recent technology of semiconductor process advances, performances of image sensors are enhanced, so that the smaller pixel size can be achieved. Therefore, optical lens assemblies with high image quality have become an indispensable part of many modern electronics. Further, with rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an image lens assembly that meets the aforementioned needs.

SUMMARY

According to one aspect of the present disclosure, an image lens assembly includes six lens elements, and the six lens elements are, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The first lens element preferably has negative refractive power, and the image-side surface of the first lens element preferably is concave in a paraxial region thereof. The second lens element preferably has negative refractive power. The fourth lens element preferably has the image-side surface being convex in a paraxial region thereof. The fifth lens element preferably has the object-side surface being convex in a paraxial region thereof. The sixth lens element preferably has negative refractive power. At least one surface of at least one of the six lens elements preferably includes at least one inflection point. When a focal length of the first lens element is f1, a focal length of the second lens element is f2, an axial distance between the first lens element and the second lens element is T12, an axial distance between the second lens element and the third lens element is T23, an axial distance between the third lens element and the fourth lens element is T34, a central thickness of the first lens element is CT1, and a central thickness of the second lens element is CT2, the following conditions preferably are satisfied: 0<f1/f2<2.0; 1.6<T12/(CT1+CT2); and 1.1<T23/T34<5.0.

According to one aspect of the present disclosure, an image apparatus includes the image lens assembly of the aforementioned aspect and an image sensor. The image sensor is disposed on an image surface of the image lens assembly.

According to one aspect of the present disclosure, an image lens assembly includes six lens elements, and the six lens elements are, in order from an object side to an image side along an optical path, a first lens element, a second lens element, a third lens element, a fourth lens element, a fifth lens element and a sixth lens element. Each of the six lens elements has an object-side surface towards the object side and an image-side surface towards the image side. The first lens element preferably has negative refractive power, and the image-side surface of the first lens element preferably is concave in a paraxial region thereof. The second lens element preferably has negative refractive power, and the image-side surface of the second lens element preferably is concave in a paraxial region thereof. The fourth lens element preferably has positive refractive power. The sixth lens element preferably has the object-side surface being concave in a paraxial region thereof. At least one surface of at least one of the six lens elements preferably includes at least one inflection point. When a focal length of the first lens element is f1, a focal length of the second lens element is f2, an axial distance between the first lens element and the second lens element is T12, an axial distance between the second lens element and the third lens element is T23, an axial distance between the third lens element and the fourth lens element is T34, a central thickness of the first lens element is CT1, and a central thickness of the second lens element is CT2, the following conditions preferably are satisfied: 0<f1/f2<2.0; 1.9<T12/(CT1+CT2); and 0.65<T23/T34<5.0.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
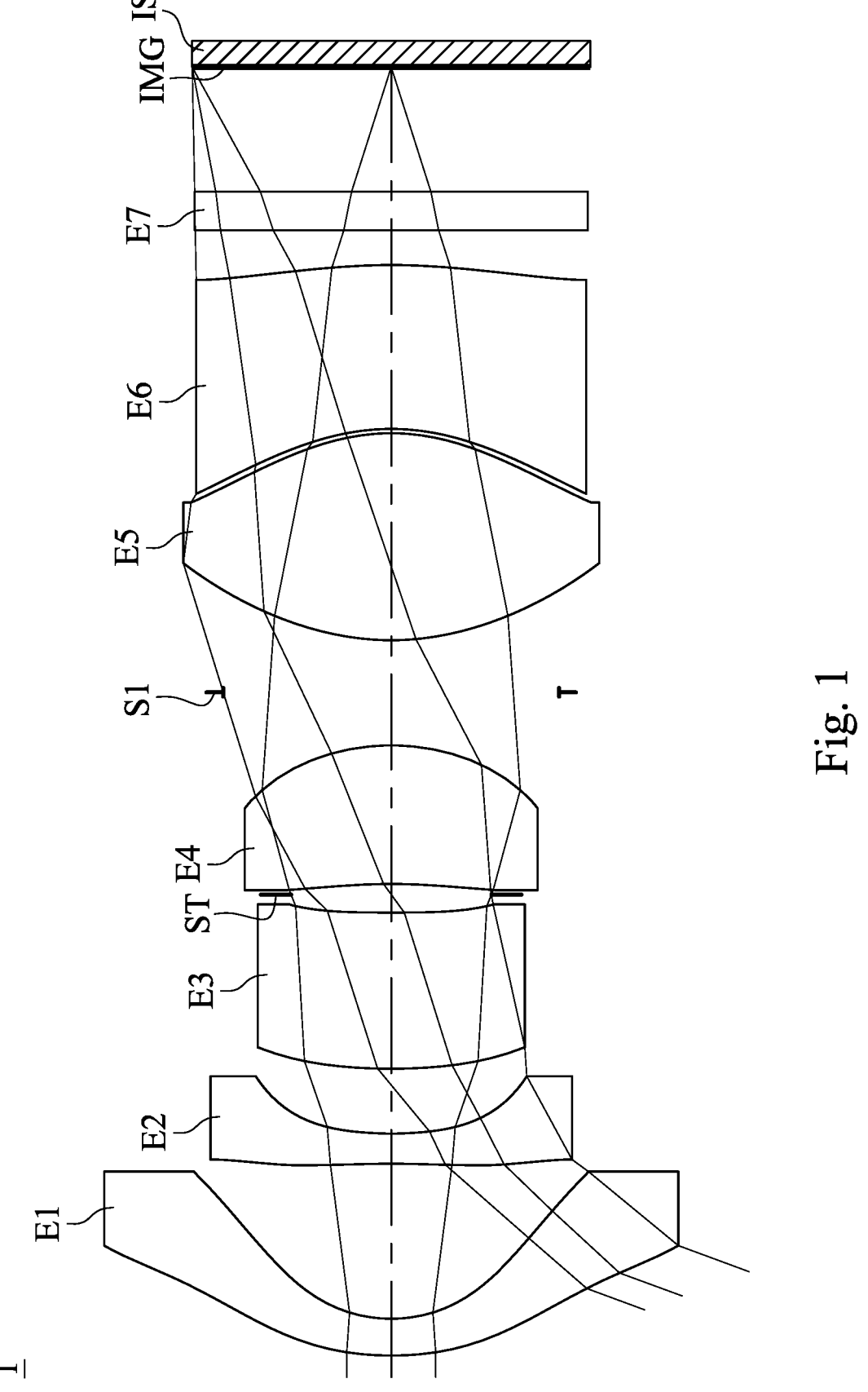
FIG. 1 is a schematic view of an image apparatus according to the 1st embodiment of the present disclosure.

The present disclosure provides an image lens assembly including six lens elements, the six lens elements are, in order from an object side to an image side along an optical path, a first lens element, a second lens element, a third lens element, a fourth lens element, a fifth lens element and a sixth lens element. Each of the lens elements has an object-side surface towards the object side and an image-side surface towards the image side.

The first lens element has negative refractive power, so that it is favorable for enlarging field of view. The object-side surface of the first lens element can be convex in a paraxial region thereof, so that the incident angle of light with wide field of view on the first lens element can be adjusted, and it is favorable for enhancing the image quality of the image with wide field of view. The image-side surface of the first lens element is concave in a paraxial region thereof, so that the surface shape and the refractive power of the first lens element can be adjusted, and it is favorable for achieving the arrangement of the wide field of view.

The second lens element has negative refractive power, so that it is favorable for enlarging the field of view. The image-side surface of the second lens element can be concave in a paraxial region thereof, so that the surface shape of the second lens element can be adjusted, and it is favorable for correcting aberrations, such as astigmatism, etc.

The fourth lens element can have positive refractive power, so that the distribution of the refractive power of the image lens assembly can be adjusted, and it is favorable for balancing the volume distribution of the image lens assembly. The image-side surface of the fourth lens element can be convex in a paraxial region thereof, so that the traveling direction of the light can be adjusted, and it is favorable for adjusting the volume distribution of the image lens assembly on the image side.

The fifth lens element can have positive refractive power, so that it is favorable for compressing the volume of the image lens assembly on the image side. The object-side surface of the fifth lens element can be convex in a paraxial region thereof, so that the fifth lens element can cooperate with the fourth lens element, and it is favorable for enhancing the image quality of the image with wide field of view. The image-side surface of the fifth lens element can be convex in a paraxial region thereof, so that the traveling direction of the light can be adjusted, and it is favorable for enlarging the image surface.

The sixth lens element can have negative refractive power, so that the refractive power of the image lens assembly on the image side can be balanced, and it is favorable for correcting aberrations, such as spherical aberration, etc. The object-side surface of the sixth lens element can be concave in a paraxial region thereof, so that the direction of light incident on the sixth lens element can be adjusted, and it is favorable for reducing surface reflections.

At least one surface of at least one of the six lens elements includes at least one inflection point. Therefore, the degree of variation of the lens surface can be increased, and it is favorable for correcting aberrations and compressing the volume of lens elements. Further, at least one surface of each of at least two of the six lens elements can include at least one inflection point.

At least one lens element of the six lens elements can be made of a glass material and have both of the object-side surface and the image-side surface being aspheric. Because the type of glass materials is various to choose, so that the image quality can be enhanced by the lens element made of a glass. Further, by the arrangement that both of the object-side surface and the image-side surface of the glass lens element are aspheric, it is favorable for further enhancing the image quality. Furthermore, at least two lens elements, at least three lens elements, at least fourth lens elements, or at least five lens elements of the six lens elements can be made of a glass material and have both of the object-side surface and the image-side surface being aspheric.

When a focal length of the first lens element is f1, and a focal length of the second lens element is f2, the following condition is satisfied: $0<f1/f2<2.0$. Therefore, the refractive power of the first lens element and the refractive power of the second lens element can cooperate with each other so as to correct aberrations. Furthermore, the following condition can be satisfied: $0.20<f1/f2<1.7$. Furthermore, the following condition can be satisfied: $0.40<f1/f2<1.5$.

When an axial distance between the first lens element and the second lens element is T12, a central thickness of the first lens element is CT1, and a central thickness of the second lens element is CT2, the following condition is satisfied: $1.6<T12/(CT1+CT2)$. Therefore, the first lens element and the second lens element can cooperate with each other, so that it is favorable for achieving the arrangement of wide field of view. Furthermore, the following conditions can be satisfied: $1.9<T12/(CT1+CT2)$; or $2.1<T12/(CT1+CT2)$. Furthermore, the following condition can be satisfied: $T12/(CT1+CT2)<3.2$. Therefore, the first lens element and the second lens element can cooperate with each other, so that it is favorable for compressing the outer diameter of the image lens assembly on the object side under the arrangement of the wide field of view. Furthermore, the following conditions can be satisfied: $T12/(CT1+CT2)<3.0$; or $T12/(CT1+CT2)<2.8$. Furthermore, the following condition can be satisfied: $2.1<T12/(CT1+CT2)<3.0$.

When an axial distance between the second lens element and the third lens element is T23, and an axial distance between the third lens element and the fourth lens element is T34, the following conditions are satisfied: $0.65<T23/T34$; or $T23/T34<5.0$. Therefore, the second lens element to the fourth lens element can cooperate with others, so that it is favorable for compressing the volume of the image lens assembly. Furthermore, the following conditions can be satisfied: $0.90<T23/T34$; $1.1<T23/T34$; or $1.3<T23/T34$. Furthermore, the following conditions can be satisfied: $T23/T34<4.5$; $T23/T34<4.0$; or $T23/T34<3.5$. Furthermore, the following condition can be satisfied: $0.65<T23/T34<5.0$. Furthermore, the following condition can be satisfied: $1.1<T23/T34<5.0$. Furthermore, the following condition can be satisfied: $1.3<T23/T34<4.0$.

When a maximum of refractive indexes of all the lens elements of the image lens assembly is Nmax, the following condition is satisfied: $1.80<Nmax<2.10$. Therefore, the distribution of the material can be adjusted, and it is favorable for compressing the volume and correcting aberrations.

When the focal length of the second lens element is f2, and the central thickness of the second lens element is CT2, the following condition is satisfied: $-30 < f2/CT2 < -6.5$. Therefore, the surface shape and the refractive power of the second lens element can be adjusted, and it is favorable for balancing between enlarging the field of view and compressing the volume. Furthermore, the following condition can be satisfied: $-25 < f2/CT2 < -9.0$.

When the axial distance between the third lens element and the fourth lens element is T34, a central thickness of the third lens element is CT3, and a central thickness of the fourth lens element is CT4, the following condition is satisfied: $3.0 < (CT3+CT4)/T34 < 18$. Therefore, the third lens element and the fourth lens element can cooperate with each other, so that it is favorable for balancing of the distribution of volumes on the object side and the image side of the image lens assembly.

When a focal length of the image lens assembly is f, and a focal length of the third lens element is f3, the following condition is satisfied: $|f/f3| < 0.25$. Therefore, the refractive power of the third lens element can be adjusted, and it is favorable for correcting aberrations.

When the axial distance between the first lens element and the second lens element is T12, and the central thickness of the first lens element is CT1, the following condition is satisfied: $3.6 < T12/CT1 < 6.0$. Therefore, the first lens element and the second lens element can cooperate with each other, so that it is favorable for balancing between the field of view and the size of the outer diameter of the lens element.

When a maximum distance between an optical effective region of the object-side surface of the first lens element and an optical axis is Y11, and a maximum image height of the image lens assembly is ImgH, the following condition is satisfied: $1.2 < Y11/ImgH < 2.0$. Therefore, the sizes of the outer diameter of the lens element and the image surface can be adjusted, and it is favorable for balancing among field of view, the distribution of the volume and the size of the image surface.

When a curvature radius of the object-side surface of the first lens element is R1, and a curvature radius of the image-side surface of the first lens element is R2, the following condition is satisfied: $1.0 < R1/R2 < 10$. Therefore, the surface shape of the first lens element can be adjusted, and it is favorable for enlarging field of view and correcting aberrations.

When a curvature radius of the image-side surface of the fourth lens element is R8, and a curvature radius of the object-side surface of the fifth lens element is R9, the following condition is satisfied: $-1.6 < R8/R9 < -0.60$. Therefore, the fourth lens element and the fifth lens element can cooperate with each other, and it is favorable for enhancing the image quality of the image with wide field of view.

When an axial distance between the object-side surface of the first lens element and an image surface is TL, and an entrance pupil diameter of the image lens assembly is EPD, the following condition is satisfied: $11.0 < TL/EPD < 22.0$. Therefore, a balance between compressing the total track length and enlarging the aperture stop can be obtained.

When a minimum of refractive indexes of all the lens elements of the image lens assembly is Nmin, the following condition is satisfied: $1.60 < Nmin < 1.70$. Therefore, the distribution of the material can be adjusted, and it is favorable for compressing the volume and correcting aberrations.

When a sum of all axial distances between two of the lens elements adjacent thereto of the image lens assembly is $\Sigma AT$, and a sum of the central thicknesses of all the lens elements of the image lens assembly is $\Sigma CT$, the following condition is satisfied: $1.1 < \Sigma CT/\Sigma AT < 3.0$. Therefore, the distribution of the lens elements can be adjusted, and it is favorable for compressing the total track length.

When a half of a maximum field of view of the image lens assembly is HFOV, the following condition is satisfied: $50.0$ degrees $< HFOV$. Therefore, it is favorable for obtaining the arrangement of wide field of view of the image lens assembly. Furthermore, the following condition can be satisfied: $60.0$ degrees $< HFOV < 110.0$ degrees. Therefore, the aberrations, such as distortion generated from excessive large field can be avoided.

When an Abbe number of the third lens element is V3, an Abbe number of the fourth lens element is V4, an Abbe number of the fifth lens element is V5, and an Abbe number of the sixth lens element is V6, the following condition is satisfied: $2.0 < (V4+V5)/(V3+V6) < 4.5$. Therefore, the distribution of the material of the lens elements can be adjusted, and it is favorable for correcting aberrations, such as chromatic aberration, etc.

When a focal length of the fourth lens element is f4, and a composite focal length of the fifth lens element and the sixth lens element is f56, the following condition is satisfied: $0.30 < f56/f4 < 2.0$. Therefore, the distribution of the refractive power of the image lens assembly on the image side can be adjusted, and it is favorable for compressing the volume of the image lens assembly on the image side. Furthermore, the following condition can be satisfied: $0.37 < f56/f4 < 1.7$.

When the central thickness of the first lens element is CT1, the central thickness of the second lens element is CT2, the central thickness of the third lens element is CT3, the central thickness of the fourth lens element is CT4, a central thickness of the fifth lens element is CT5, and a central thickness of the sixth lens element is CT6, the following condition is satisfied: $14.0 < (CT2+CT3+CT4+CT5+CT6)/CT1 < 27.0$. Therefore, the distribution of the lens elements of the image lens assembly can be adjusted, and it is favorable for compressing the volume.

When the axial distance between the object-side surface of the first lens element and the image surface is TL, and the maximum image height of the image lens assembly is ImgH, the following condition is satisfied: $2.0 < TL/ImgH < 10$. Therefore, it is favorable for balancing between compressing the total track length and enlarging the image surface. Furthermore, the following condition can be satisfied: $4.0 < TL/ImgH < 7.0$.

When an f-number of the image lens assembly is Fno, the following condition is satisfied: $1.0 < Fno < 2.5$. Therefore, it is favorable for balancing between the illumination and the depth of field. Furthermore, the following condition can be satisfied: $1.2 < Fno < 2.0$.

When an axial distance between the fourth lens element and the fifth lens element is T45, and an axial distance between the fifth lens element and the sixth lens element is T56, the following condition is satisfied: $1.5 < T45/T56$. Therefore, the lens elements of the image lens assembly on the image side thereof can cooperate with each other so as to correct aberrations. Furthermore, the following condition can be satisfied: $3.5 < T45/T56$.

When a curvature radius of the image-side surface of the fifth lens element is R10, and a curvature radius of the object-side surface of the sixth lens element is R11, the following condition is satisfied: $0.80 < R10/R11 < 1.4$. Therefore, the surface shapes of the fifth lens element and the sixth lens element can cooperate with each other so as to correct aberrations.

When a curvature radius of the image-side surface of the second lens element is R4, and the central thickness of the second lens element is CT2, the following condition is satisfied: 4.5<R4/CT2<25. Therefore, the surface shape of the second lens element can be adjusted, and it is favorable for enlarging field of view and compressing the outer diameter of the lens element. Furthermore, the following condition can be satisfied: 5.0<R4/CT2<22.

Each of the aforementioned features of the image lens assembly of the present disclosure can be utilized in various combinations for achieving the corresponding effects.

According to the image lens assembly of the present disclosure, the lens elements can be made of glass or plastic materials. When the lens elements are made of glass materials, the degrees of freedom of the refractive power distribution of the image lens assembly can be enhanced. The glass lens element can either be made by grinding or molding. When the lens elements are made of plastic materials, manufacturing costs can be effectively reduced. Further, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements. Thus, the total track length of the image lens assembly of the present disclosure can be reduced. The aspheric surfaces can be formed by a plastic injection molding method, a glass molding method or other manufacturing methods.

According to the image lens assembly of the present disclosure, additives can be selectively added into any one (or more) material of the lens elements so as to change the transmittance of the lens element in a particular wavelength range. Therefore, the stray light and the chromatic aberration can be reduced. For example, the additives can have the absorption ability for lights in a wavelength range of 600 nm-800 nm in the image lens assembly so as to reduce extra red light or infrared lights, or the additives can have the absorption ability for lights in a wavelength range of 350 nm-450 nm in the image lens assembly so as to reduce blue light or ultraviolet lights. Therefore, the additives can prevent the image from interfering by lights in a particular wavelength range. Further, the additives can be homogeneously mixed with the plastic material, and the lens elements can be made by the injection molding method. Furthermore, the additives can be a coating membrane on the surfaces of the lens elements so as to provide the aforementioned effects.

According to the image lens assembly of the present disclosure, when a surface of the lens element is aspheric, it indicates that the entire optical effective region of the surface of the lens element or a part thereof is aspheric.

According to the image lens assembly of the present disclosure, when the lens elements have surfaces being convex and the convex surface position is not defined, it indicates that the aforementioned surfaces of the lens elements can be convex in the paraxial regions thereof. When the lens elements have surfaces being concave and the concave surface position is not been defined, it indicates that the aforementioned surfaces of the lens elements can be concave in the paraxial regions thereof. In the image lens assembly of the present disclosure, if the lens element has positive refractive power or negative refractive power, or the focal length of the lens element, all can be referred to the refractive power, or the focal length, in the paraxial region of the lens element.

According to the image lens assembly of the present disclosure, a critical point is a non-axial point of the lens surface where its tangent is perpendicular to the optical axis; and an inflection point is a point on a lens surface with a curvature changing from positive to negative or from negative to positive.

According to the image lens assembly of the present disclosure, the image surface thereof can be a flat surface or a curved surface having a curvature based on the corresponding image sensor. In particular, the image surface can be a concave curved surface facing towards the object side. Further, the image lens assembly of the present disclosure can selectively include at least one image correcting element (such as a field flattener) inserted between the lens element closest to the image surface and the image surface, and thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 15A:
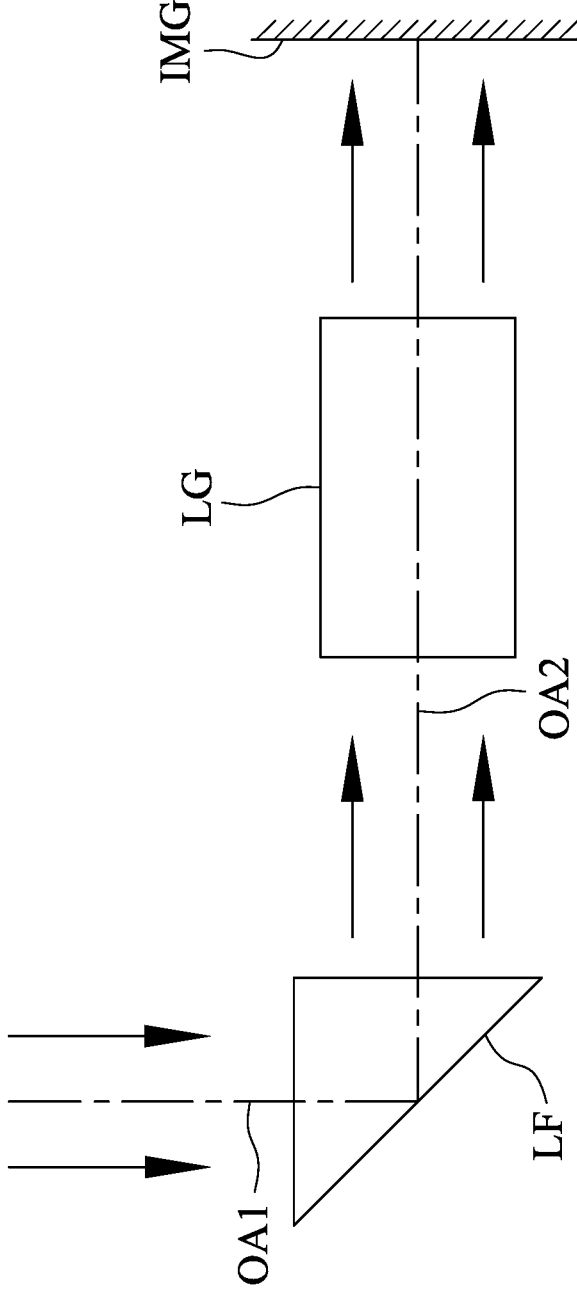
FIG. 15A is a schematic view of an arrangement of a light path folding element in an image lens assembly of the present disclosure.
Figure 15B:
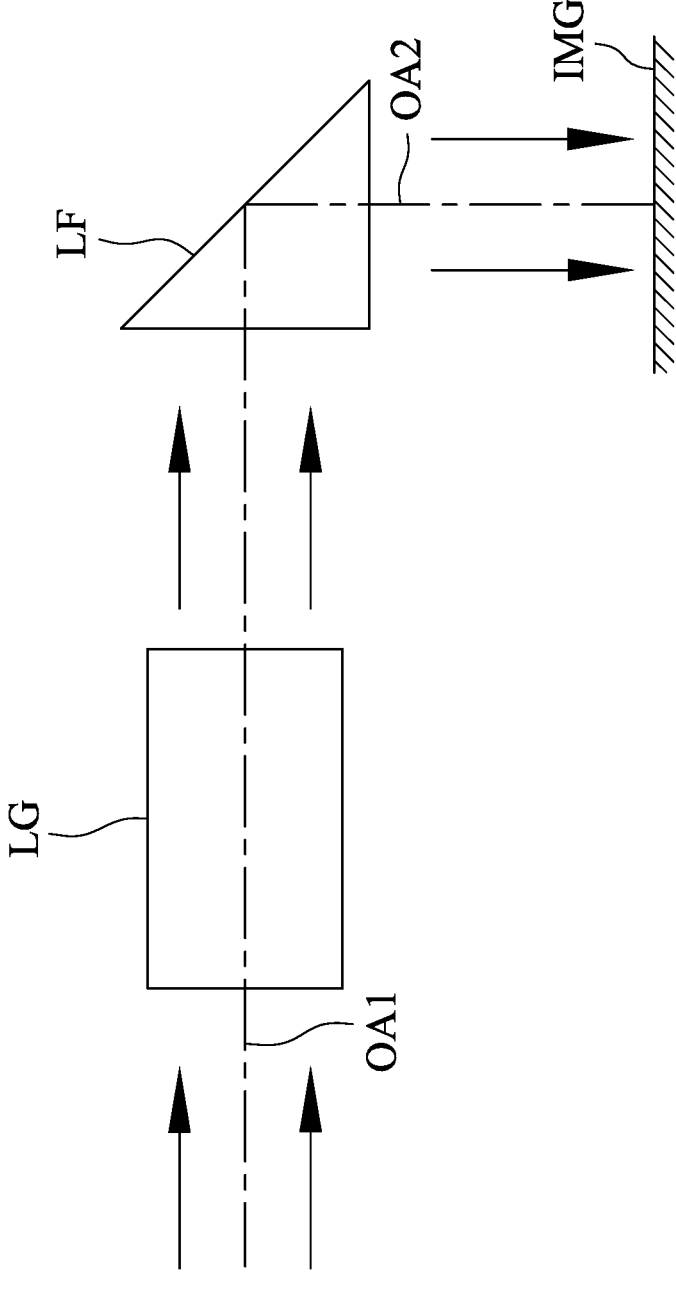
FIG. 15B is a schematic view of another arrangement of the light path folding element in an image lens assembly of the present disclosure.
Figure 15C:
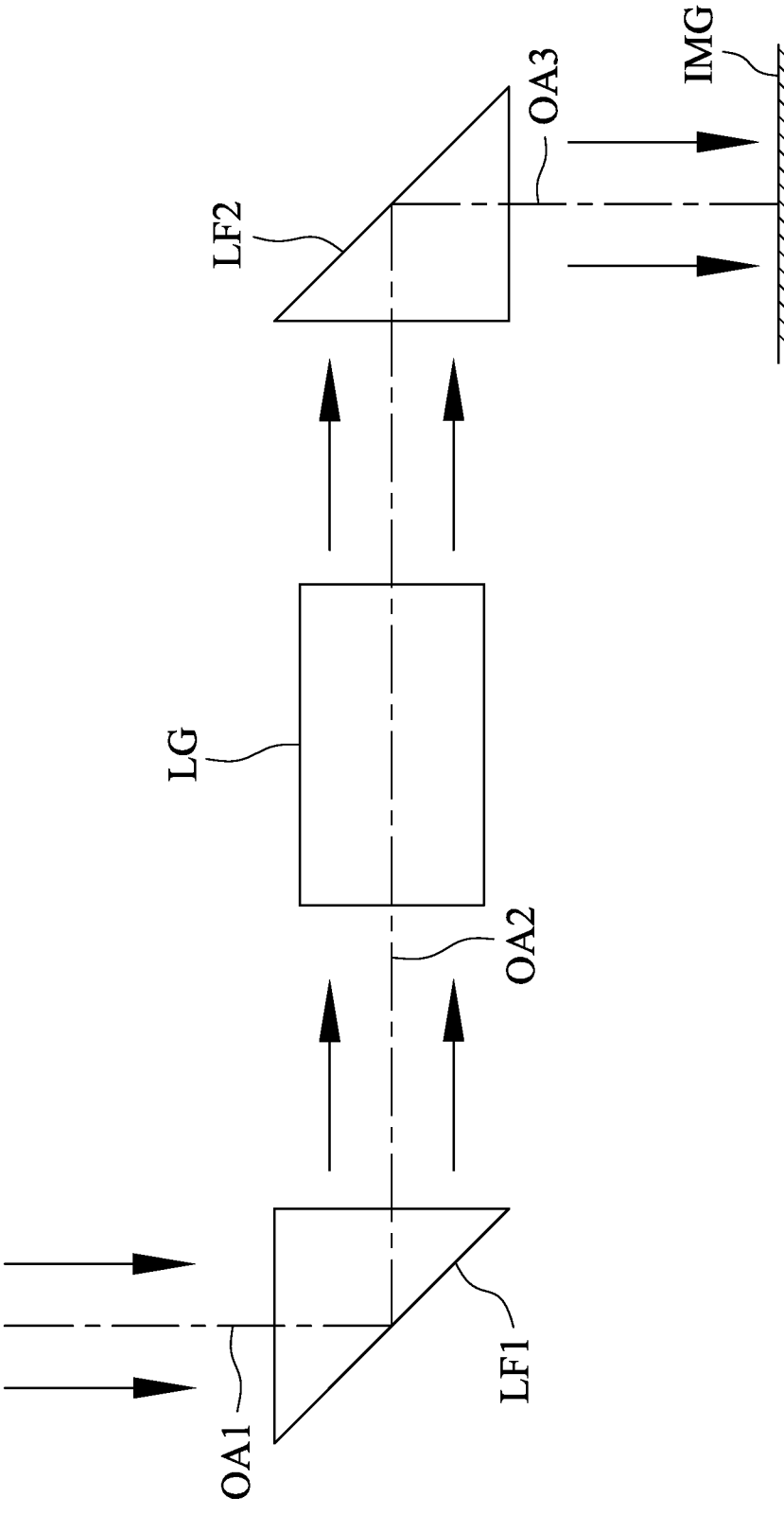
FIG. 15C is a schematic view of an arrangement of two light path folding elements in an image lens assembly of the present disclosure.

According to the image lens assembly of the present disclosure, at least one element with light path folding function can be selectively disposed between the imaged object and the image surface, such as a prism or a mirror, etc. Therefore, it is favorable for providing high flexible space arrangement of the image lens assembly, so that the compactness of the electronic device would not be restricted by the optical total track length of the image lens assembly. Further, FIG. 15A is a schematic view of an arrangement of a light path folding element LF in an image lens assembly of the present disclosure, and FIG. 15B is a schematic view of another arrangement of the light path folding element LF in an image lens assembly of the present disclosure. As shown in FIG. 15A and FIG. 15B, the image lens assembly can include, in order from an imaged object (not shown in drawings) to an image surface IMG, a first optical axis OA1, the light path folding element LF and a second optical axis OA2, wherein the light path folding element LF can be disposed between the imaged object and a lens group LG of the image lens assembly as shown in FIG. 15A, or can be disposed between the lens group LG of the image lens assembly and the image surface IMG as shown in FIG. 15B. Further, FIG. 15C is a schematic view of an arrangement of two light path folding elements LF1, LF2 in an image lens assembly of the present disclosure. As shown in FIG. 15C, the image lens assembly can include, in order from an imaged object (not shown in drawings) to an image surface IMG, a first optical axis OA1, the light path folding element LF1, a second optical axis OA2, the light path folding element LF2 and a third optical axis OA3, wherein the light path folding element LF1 is disposed between the imaged object and a lens group LG of the image lens assembly, and the light path folding element LF2 is disposed between the lens group LG of image lens assembly and the image surface IMG. The image lens assembly can also be selectively disposed with three or more light path folding elements, and the type, amount and location of the light path folding elements will not be limited to the figures of the present disclosure.

Further, the image lens assembly of the present disclosure can include at least one stop, such as an aperture stop, a glare stop or a field stop, so that it is favorable for eliminating the stray light and thereby improving the image resolution thereof.

According to the image lens assembly of the present disclosure, the aperture stop can be configured as a front stop or a middle stop, wherein the front stop indicates that the aperture stop is disposed between an imaged object and the first lens element, and the middle stop indicates that the aperture stop is disposed between the first lens element and the image surface. When the aperture stop is a front stop, a longer distance between an exit pupil of the image lens assembly and the image surface can be obtained, and thereby obtains a telecentric effect and improves the image-sensing efficiency of the image sensor, such as CCD or CMOS. When the aperture stop is a middle stop, it is favorable for enlarging field of view of the image lens assembly and thereby provides a wider field of view for the same.

According to the image lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component, such as a light filter, an electrochromic material, a liquid crystal layer or the like. The amount of incoming light or the exposure time of the image can be controlled by the aperture control unit to enhance the image moderation ability. Further, the aperture control unit can be the aperture stop of the image lens assembly of the present disclosure, so that the image quality can be moderated by changing the f-number, such as changing the depth of field or the exposure speed.

The image lens assembly of the present disclosure can be properly configured with one or more optical element, so that the way of light passing through the image lens assembly can be restricted. The aforementioned optical element can be a filter, a polarizer, etc., and it is not limited thereto. The aforementioned optical element can be a monolithic component, a composite component or a thin film, and it is not limited thereto. The aforementioned optical element can be disposed at the object side, at the image side or between the lens elements of the image lens assembly so as to allow the specific light to pass through, which will meet the requirements of applications.

The image lens assembly of the present disclosure can be applied to 3D (three-dimensional) image capturing applications, digital cameras, mobile devices, digital tablets, smart TVs, surveillance systems, motion sensing input devices, driving recording systems, rearview camera systems, wearable devices, unmanned aerial vehicles, and other electronic devices.

According to the present disclosure, an imaging apparatus including the aforementioned image lens assembly and an image sensor is provided, wherein the image sensor is disposed on the image surface of the image lens assembly. By arranging refractive power and surface shapes of the first lens element and the second lens element, it is favorable for enlarging field of view so as to achieve the arrangement of wide field of view, and the aberrations can be corrected. Furthermore, the imaging apparatus can further include a barrel member, a holder member, or a combination thereof.

1st Embodiment

Figure 2:
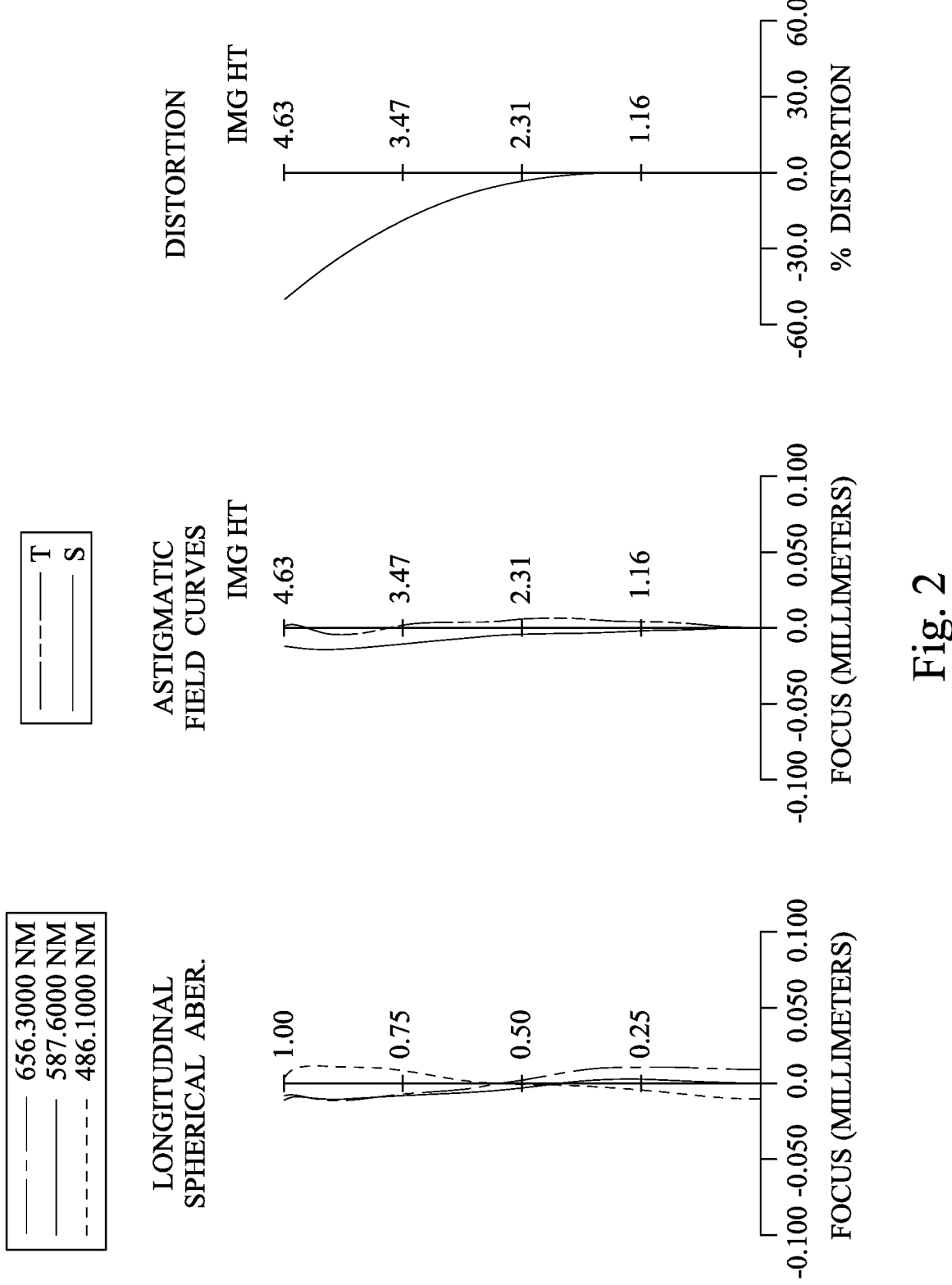
FIG. 2 shows spherical aberration curves, astigmatic field curves and a distortion curve of the 1st embodiment.

FIG. 1 is a schematic view of an image apparatus 1 according to the 1st embodiment of the present disclosure, and FIG. 2 shows spherical aberration curves, astigmatic field curves and a distortion curve of the 1st embodiment. As shown in FIG. 1, the image apparatus 1 of the 1st embodiment includes an image lens assembly (reference number is omitted) and an image sensor IS. The image lens assembly includes, in order from an object side to an image side along an optical path, a first lens element E1, a second lens element E2, a third lens element E3, an aperture stop ST, a fourth lens element E4, a stop S1, a fifth lens element E5, a sixth lens element E6, a filter E7 and an image surface IMG. The image sensor IS is disposed on the image surface IMG of the image lens assembly, wherein the image lens assembly includes six lens elements (E1, E2, E3, E4, E5, E6) without additional one or more lens elements inserted between the first lens element E1 and the sixth lens element E6.

Figure 13:
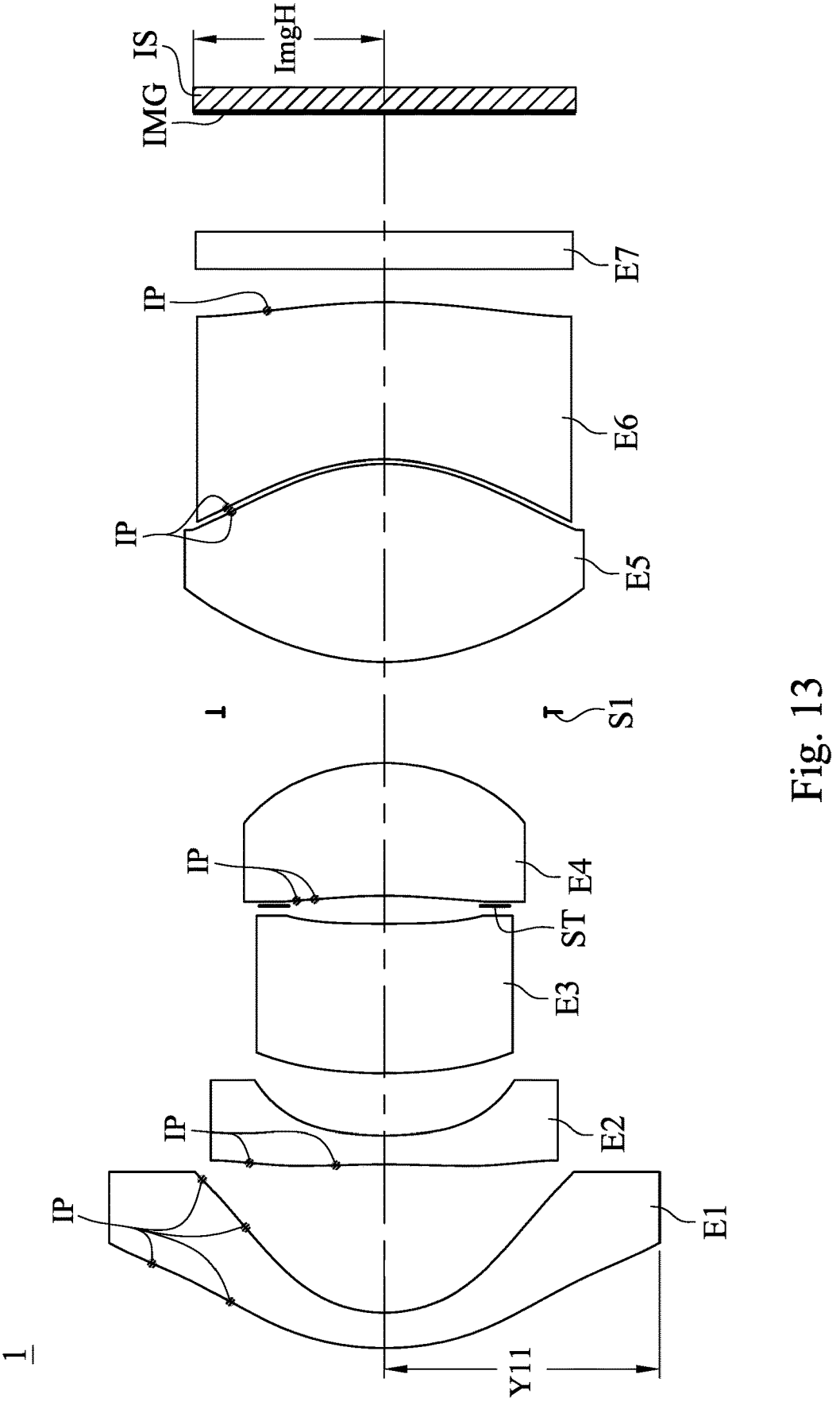
FIG. 13 is a schematic view of part of the parameters and inflection points of each of the lens elements according to the 1st embodiment.

The first lens element E1 with negative refractive power has an object-side surface being convex in a paraxial region thereof and an image-side surface being concave in a paraxial region thereof. The first lens element E1 is made of a glass material and has the object-side surface and the image-side surface being both aspheric. Further, FIG. 13 is a schematic view of part of the parameters and inflection points IP of each of the lens elements according to the 1st embodiment. As shown in FIG. 13, the object-side surface of the first lens element E1 includes two inflection points IP, and the image-side surface of the first lens element E1 includes two inflection points IP.

The second lens element E2 with negative refractive power has an object-side surface being concave in a paraxial region thereof and an image-side surface being concave in a paraxial region thereof. The second lens element E2 is made of a glass material and has the object-side surface and the image-side surface being both aspheric. Further, the object-side surface of the second lens element E2 includes two inflection points IP (as shown in FIG. 13).

The third lens element E3 with positive refractive power has an object-side surface being convex in a paraxial region thereof and an image-side surface being concave in a paraxial region thereof. The third lens element E3 is made of a glass material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of a glass material and has the object-side surface and the image-side surface being both aspheric. Further, the object-side surface of the fourth lens element E4 includes two inflection points IP (as shown in FIG. 13).

The fifth lens element E5 with positive refractive power has an object-side surface being convex in a paraxial region thereof and an image-side surface being convex in a paraxial region thereof. The fifth lens element E5 is made of a glass material and has the object-side surface and the image-side surface being both aspheric. Further, the image-side surface of the fifth lens element E5 includes one inflection point IP (as shown in FIG. 13).

The sixth lens element E6 with negative refractive power has an object-side surface being concave in a paraxial region thereof and an image-side surface being convex in a paraxial region thereof. The sixth lens element E6 is made of a glass material and has the object-side surface and the image-side surface being both aspheric. Further, the object-side surface of the sixth lens element E6 includes one inflection point IP (as shown in FIG. 13), and the image-side surface of the sixth lens element E6 includes one inflection point IP (as shown in FIG. 13).

The filter E7 is made of a glass material, which is disposed between the sixth lens element E6 and the image surface IMG and will not affect the focal length of the image lens assembly.

The equation of the aspheric surface profiles of the aforementioned lens elements of the 1st embodiment is expressed as follows:

$$X(Y) = (Y^2/R)/\left(1 + sqrt\left(1 - (1+k) \times (Y/R)^2\right)\right) + \sum_i (Ai) \times (Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient.

In the image lens assembly of the 1st embodiment, when a focal length of the image lens assembly is f, an f-number of the image lens assembly is Fno, and a half of a maximum field of view of the image lens assembly is HFOV, these parameters have the following values: f=3.41 mm; Fno=1.65; and HFOV=69.8 degrees.

In the image lens assembly of the 1st embodiment, when a refractive index of the first lens element E1 is N1, a refractive index of the second lens element E2 is N2, a refractive index of the third lens element E3 is N3, a refractive index of the fourth lens element E4 is N4, a refractive index of the fifth lens element E5 is N5, a refractive index of the sixth lens element E6 is N6, a maximum of refractive indexes of all the lens elements of the image lens assembly is Nmax, and a minimum of refractive indexes of all the lens elements of the image lens assembly is Nmin, the following conditions are satisfied: Nmax=2.002; and Nmin=1.619. In the 1st embodiment, Nmax is the refractive index N3 of the third lens element E3 and the refractive index N6 of the sixth lens element E6, and Nmin is the refractive index N4 of the fourth lens element E4 and the refractive index N5 of the fifth lens element E5.

In the image lens assembly of the 1st embodiment, when an Abbe number of the third lens element E3 is V3, an Abbe number of the fourth lens element E4 is V4, an Abbe number of the fifth lens element E5 is V5, and an Abbe number of the sixth lens element E6 is V6, the following condition is satisfied: (V4+V5)/(V3+V6)=3.30.

In the image lens assembly of the 1st embodiment, when a central thickness of the first lens element E1 is CT1, a central thickness of the second lens element E2 is CT2, a central thickness of the third lens element E3 is CT3, a central thickness of the fourth lens element E4 is CT4, a central thickness of the fifth lens element E5 is CT5, and a central thickness of the sixth lens element E6 is CT6, the following condition is satisfied: (CT2+CT3+CT4+CT5+CT6)/CT1=18.91.

In the image lens assembly of the 1st embodiment, when an axial distance between the third lens element E3 and the fourth lens element E4 is T34, the central thickness of the third lens element E3 is CT3, and the central thickness of the fourth lens element E4 is CT4, the following condition is satisfied: (CT3+CT4)/T34=10.28.

In the image lens assembly of the 1st embodiment, when an axial distance between the first lens element E1 and the second lens element E2 is T12, the central thickness of the first lens element E1 is CT1, and the central thickness of the second lens element E2 is CT2, the following condition is satisfied: T12/(CT1+CT2)=2.32.

In the image lens assembly of the 1st embodiment, when the axial distance between the first lens element E1 and the second lens element E2 is T12, and the central thickness of the first lens element E1 is CT1, the following condition is satisfied: T12/CT1=4.21.

In the image lens assembly of the 1st embodiment, when an axial distance between the second lens element E2 and the third lens element E3 is T23, and the axial distance between the third lens element E3 and the fourth lens element E4 is T34, the following condition is satisfied: T23/T34=2.27.

In the image lens assembly of the 1st embodiment, when an axial distance between the fourth lens element E4 and the fifth lens element E5 is T45, and an axial distance between the fifth lens element E5 and the sixth lens element E6 is T56, the following condition is satisfied: T45/T56=24.45.

In the image lens assembly of the 1st embodiment, when an axial distance between the object-side surface of the first lens element E1 and the image surface IMG is TL, and an entrance pupil diameter of the image lens assembly is EPD, the following condition is satisfied: TL/EPD=14.50.

In the image lens assembly of the 1st embodiment, when the axial distance between the object-side surface of the first lens element E1 and the image surface IMG is TL, and a maximum image height of the image lens assembly is ImgH (as shown in FIG. 13), the following condition is satisfied: TL/ImgH=6.47.

In the image lens assembly of the 1st embodiment, when the axial distance between the first lens element E1 and the second lens element E2 is T12, the axial distance between the second lens element E2 and the third lens element E3 is T23, the axial distance between the third lens element E3 and the fourth lens element E4 is T34, the axial distance between the fourth lens element E4 and the fifth lens element E5 is T45, the axial distance between the fifth lens element E5 and the sixth lens element E6 is T56, a sum of all axial distances between two of the lens elements adjacent thereto of the image lens assembly is ΣAT, the central thickness of the first lens element E1 is CT1, the central thickness of the second lens element E2 is CT2, the central thickness of the third lens element E3 is CT3, the central thickness of the fourth lens element E4 is CT4, the central thickness of the fifth lens element E5 is CT5, the central thickness of the sixth lens element E6 is CT6, and a sum of the central thicknesses of all the lens elements of the image lens assembly is ΣCT, the following condition is satisfied: ΣCT/ΣAT=2.05. In the 1st embodiment, an axial distance between two of the lens elements adjacent thereto indicates a distance along the optical axis between two adjacent lens surfaces of the adjacent lens elements; ΣCT=CT1+CT2+CT3+CT4+CT5+CT6; and ΣAT=T12+T23+T34+T45+T56.

In the image lens assembly of the 1st embodiment, when a curvature radius of the object-side surface of the first lens element E1 is R1, and a curvature radius of the image-side surface of the first lens element E1 is R2, the following condition is satisfied: R1/R2=2.18.

In the image lens assembly of the 1st embodiment, when a curvature radius of the image-side surface of the second lens element E2 is R4, and the central thickness of the second lens element E2 is CT2, the following condition is satisfied: R4/CT2=11.34.

In the image lens assembly of the 1st embodiment, when a curvature radius of the image-side surface of the fourth lens element E4 is R8, and a curvature radius of the object-side surface of the fifth lens element E5 is R9, the following condition is satisfied: R8/R9=−0.87.

In the image lens assembly of the 1st embodiment, when a curvature radius of the image-side surface of the fifth lens element E5 is R10, and a curvature radius of the object-side surface of the sixth lens element E6 is R11, the following condition is satisfied: R10/R11=0.92.

In the image lens assembly of the 1st embodiment, when the focal length of the image lens assembly is f, and a focal length of the third lens element E3 is f3, the following condition is satisfied: If/f31=0.20.

In the image lens assembly of the 1st embodiment, when a focal length of the first lens element E1 is f1, and a focal length of the second lens element E2 is f2, the following condition is satisfied: f1/f2=0.96.

In the image lens assembly of the 1st embodiment, when the focal length of the second lens element E2 is f2, and the central thickness of the second lens element E2 is CT2, the following condition is satisfied: f2/CT2=−12.95.

In the image lens assembly of the 1st embodiment, when a focal length of the fourth lens element E4 is f4, and a composite focal length of the fifth lens element E5 and the sixth lens element E6 is f56, the following condition is satisfied: f56/f4=0.83.

In the image lens assembly of the 1st embodiment, when a maximum distance between an optical effective region of the object-side surface of the first lens element E1 and an optical axis is Y11 (as shown in FIG. 13), and the maximum image height of the image lens assembly is ImgH, the following condition is satisfied: Y11/ImgH=1.44.

The detailed optical data of the 1st embodiment are shown in Table 1A, and the aspheric surface data are shown in Table 1B below.

TABLE 1A

1st Embodiment
f = 3.41 mm, Fno = 1.65, HFOV = 69.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.4372 | ASP | 0.855 | Glass | 1.806 | 40.7 | −8.67 |
| 2 | | 3.4181 | ASP | 3.600 | | | | |
| 3 | Lens 2 | −31.2425 | ASP | 0.700 | Glass | 1.693 | 53.2 | −9.06 |
| 4 | | 7.9408 | ASP | 1.509 | | | | |
| 5 | Lens 3 | 12.9662 | ASP | 3.628 | Glass | 2.002 | 19.3 | 17.22 |
| 6 | | 44.8779 | ASP | 0.420 | | | | |
| 7 | Ape. Stop | Plano | | 0.246 | | | | |
| 8 | Lens 4 | −14.0972 | ASP | 3.219 | Glass | 1.619 | 63.9 | 12.26 |
| 9 | | −5.3630 | ASP | 1.235 | | | | |
| 10 | Stop | Plano | | 1.210 | | | | |
| 11 | Lens 5 | 6.1996 | ASP | 4.810 | Glass | 1.619 | 63.9 | 5.32 |
| 12 | | −4.9304 | ASP | 0.100 | | | | |
| 13 | Lens 6 | −5.3340 | ASP | 3.809 | Glass | 2.002 | 19.3 | −10.51 |
| 14 | | −14.6783 | ASP | 0.805 | | | | |
| 15 | Filter | Plano | | 0.900 | Glass | 1.517 | 64.2 | — |
| 16 | | Plano | | 2.899 | | | | |
| 17 | Image | Plano | | — | | | | |

Reference wavelength is 587.6 nm (d-line).
Effective radius of Surface 10 (stop S1) is 3.900 mm.

45

TABLE 1B

Aspheric Coefficients

| Surface # | 1 | 2 | 3 | 4 |
|---|---|---|---|---|
| k = | −3.82044E+00 | −1.47008E+00 | 0.00000E+00 | 4.33168E+00 |
| A4 = | 4.21479E−03 | 8.24354E−03 | 1.13296E−03 | 1.12825E−03 |
| A6 = | −2.67817E−04 | −1.63034E−04 | 3.15146E−04 | 6.09720E−04 |
| A8 = | 6.97831E−06 | −3.11717E−05 | −3.49448E−05 | −2.58430E−05 |
| A10 = | −8.60135E−08 | 1.66723E−06 | 1.27968E−06 | 1.35828E−06 |
| A12 = | 4.27907E−10 | −2.40246E−08 | −1.65856E−08 | −1.48639E−07 |

| Surface # | 5 | 6 | 8 | 9 |
|---|---|---|---|---|
| k = | 6.23176E+00 | 0.00000E+00 | 0.00000E+00 | 9.85295E−01 |
| A4 = | 3.67730E−04 | 3.08656E−03 | 1.63274E−03 | −5.26817E−04 |
| A6 = | 1.38116E−04 | 2.46556E−04 | 2.19036E−04 | 5.66444E−05 |
| A8 = | −7.28537E−06 | −1.43604E−05 | −5.32827E−05 | 1.69512E−06 |
| A10 = | −7.12331E−08 | 3.04617E−06 | 9.34499E−06 | −3.01453E−07 |
| A12 = | −1.07850E−08 | −4.81447E−07 | −9.00778E−07 | 1.81771E−08 |

TABLE 1B-continued

| | | Aspheric Coefficients | | |
|---|---|---|---|---|
| Surface # | 11 | 12 | 13 | 14 |
| k = | −1.43587E+00 | −8.06455E−01 | −7.06837E−01 | −7.45136E+00 |
| A4 = | −4.98050E−04 | 1.07356E−03 | 1.18560E−03 | 1.08704E−03 |
| A6 = | 4.59172E−05 | 7.04063E−05 | 1.57847E−05 | −4.81748E−05 |
| A8 = | −1.65427E−06 | −5.01875E−06 | −2.19578E−06 | 1.38033E−06 |
| A10 = | 3.69667E−08 | 1.56285E−07 | 1.15237E−07 | −8.31239E−09 |
| A12 = | −3.52690E−10 | −1.64589E−09 | −1.80141E−09 | 2.21269E−10 |

In Table 1A, according to the 1st embodiment of FIG. 1A, the curvature radius, the thickness and the focal length are shown in millimeters (mm). Surface numbers 0-17 represent the surfaces sequentially arranged from the object side to the image side along the optical axis. In Table 1 B, according to the 1st embodiment of FIG. 1A, k represents the conic coefficient of the equation of the aspheric surface profiles, and A4-A12 represent the aspheric coefficients ranging from the 4th order to the 12th order. Further, the tables presented below for each embodiment correspond to schematic parameter and aberration curves of each embodiment, and term definitions of the tables are the same as those in Table 1A and Table 1B of the 1st embodiment. Therefore, an explanation in this regard will not be provided again.

2nd Embodiment

Figure 3:
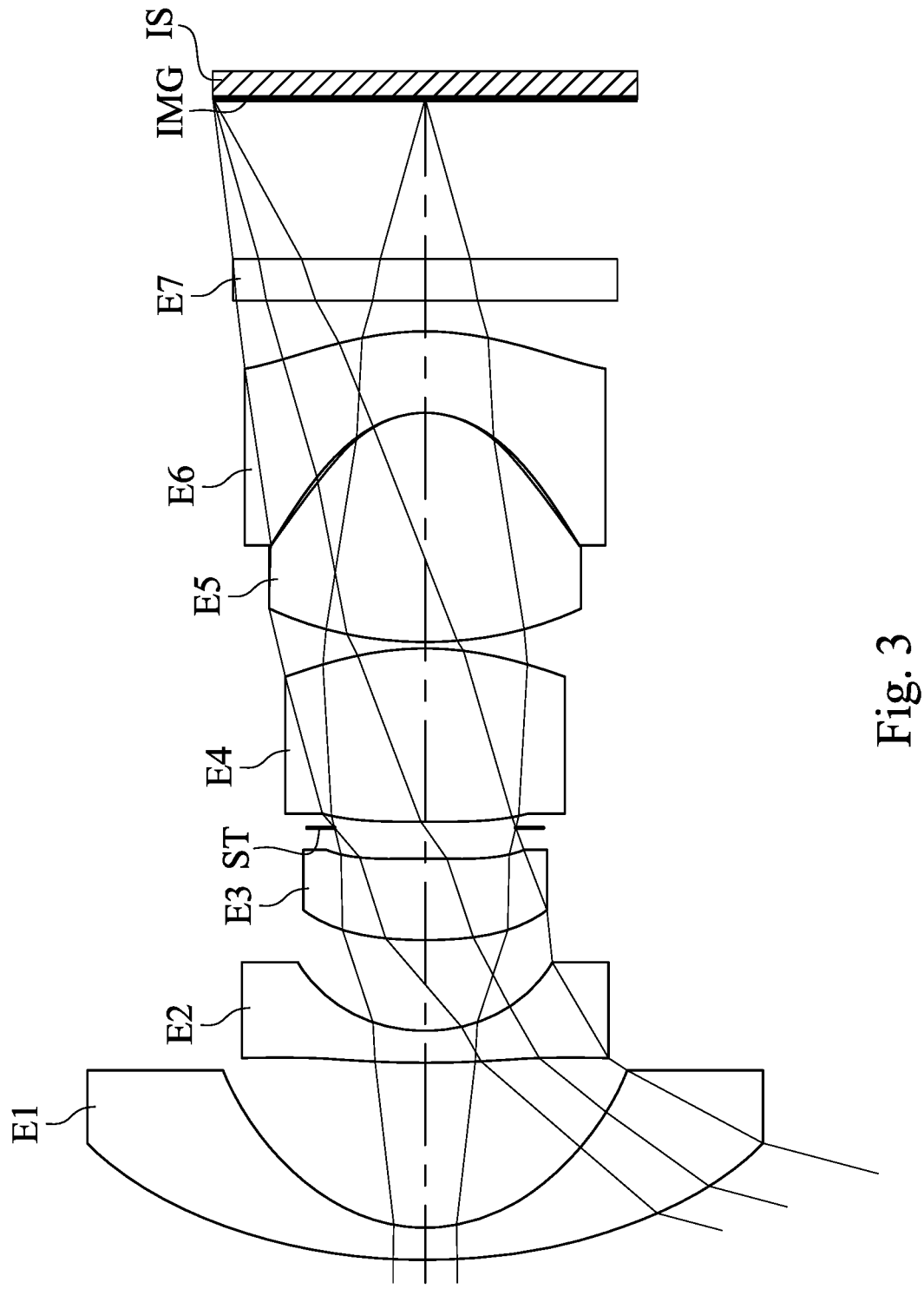
FIG. 3 is a schematic view of an image apparatus according to the 2nd embodiment of the present disclosure.
Figure 4:
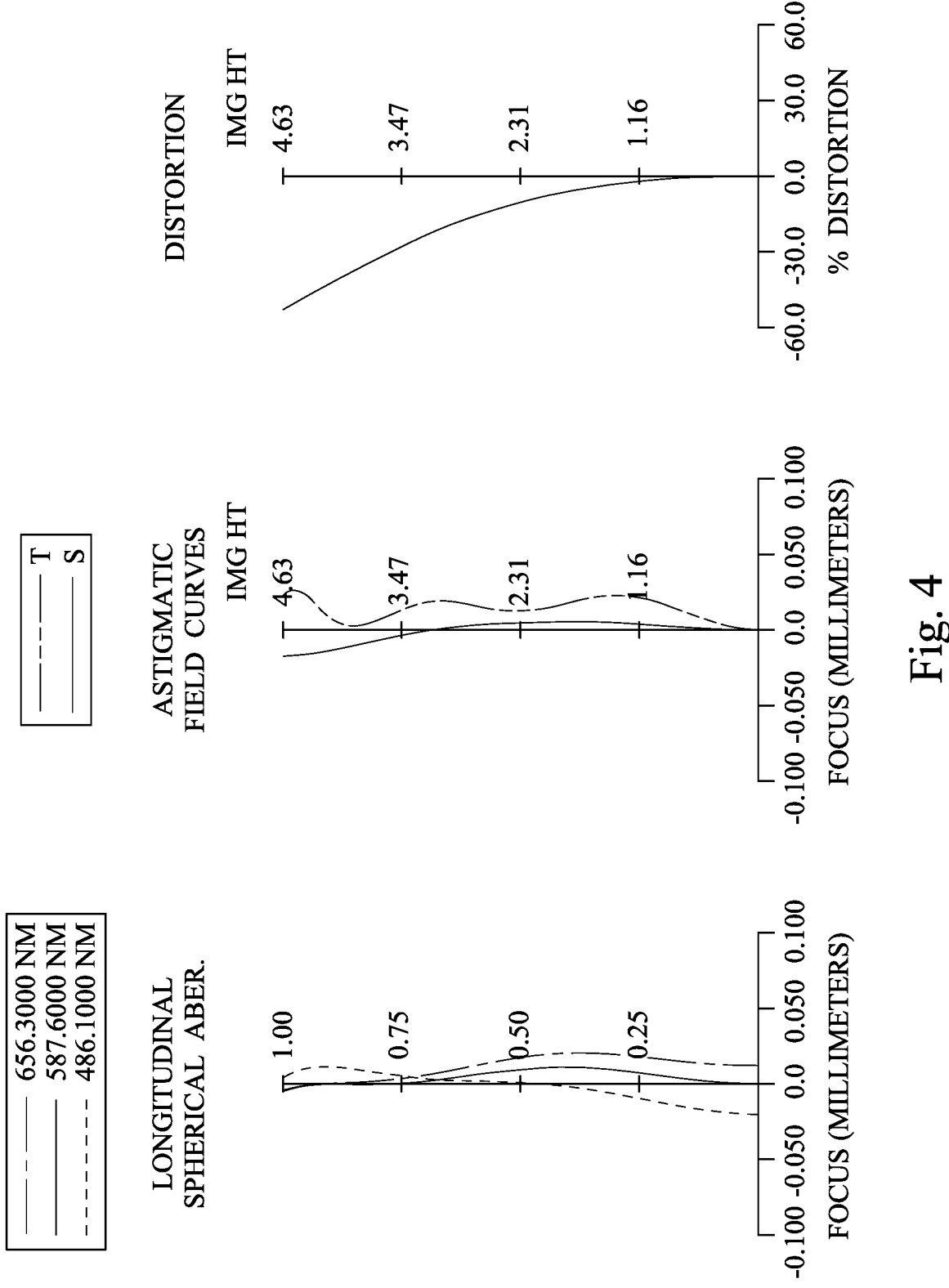
FIG. 4 shows spherical aberration curves, astigmatic field curves and a distortion curve of the 2nd embodiment.

FIG. 3 is a schematic view of an image apparatus 2 according to the 2nd embodiment of the present disclosure, and FIG. 4 shows spherical aberration curves, astigmatic field curves and a distortion curve of the 2nd embodiment. As shown in FIG. 3, the image apparatus 2 of the 2nd embodiment includes an image lens assembly (reference number is omitted) and an image sensor IS. The image lens assembly includes, in order from an object side to an image side along an optical path, a first lens element E1, a second lens element E2, a third lens element E3, an aperture stop ST, a fourth lens element E4, a fifth lens element E5, a sixth lens element E6, a filter E7 and an image surface IMG. The image sensor IS is disposed on the image surface IMG of the image lens assembly, wherein the image lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of a glass material and has the object-side surface and the image-side surface being both aspheric. Further, the object-side surface of the second lens element E2 includes one inflection point.

The third lens element E3 with positive refractive power has an object-side surface being convex in a paraxial region thereof and an image-side surface being convex in a paraxial region thereof. The third lens element E3 is made of a glass material and has the object-side surface and the image-side surface being both aspheric. Further, the image-side surface of the third lens element E3 includes one inflection point.

The fourth lens element E4 with positive refractive power has an object-side surface being convex in a paraxial region thereof and an image-side surface being convex in a paraxial region thereof. The fourth lens element E4 is made of a glass material and has the object-side surface and the image-side surface being both aspheric. Further, the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a glass material and has the object-side surface and the image-side surface being both aspheric. Further, the object-side surface of the fifth lens element E5 includes one inflection point.

The sixth lens element E6 with negative refractive power has an object-side surface being concave in a paraxial region thereof and an image-side surface being convex in a paraxial region thereof. The sixth lens element E6 is made of a glass material and has the object-side surface and the image-side surface being both aspheric. Further, the image-side surface of the sixth lens element E6 includes one inflection point. Furthermore, the image-side surface of the fifth lens element E5 and the object-side surface of the sixth lens element E6 are adhesive to each other so as to form a cemented lens.

The filter E7 is made of a glass material, which is disposed between the sixth lens element E6 and the image surface IMG and will not affect the focal length of the image lens assembly.

The detailed optical data of the 2nd embodiment are shown in Table 2A, and the aspheric surface data are shown in Table 2B below.

TABLE 2A

| | | | | | | | | Focal |
|---|---|---|---|---|---|---|---|---|
| Surface # | | Curvature Radius | | Thickness | Material | Index | Abbe # | Length |
| 0 | Object | Plano | | Infinity | | | | |
| 1 | Lens 1 | 15.9303 | ASP | 0.700 | Glass | 1.806 | 40.7 | −6.23 |
| 2 | | 3.7431 | ASP | 3.600 | | | | |
| 3 | Lens 2 | 27.3955 | ASP | 0.700 | Glass | 1.619 | 63.9 | −7.49 |

2nd Embodiment
f = 2.59 mm, Fno = 1.85, HFOV = 75.2 deg.

TABLE 2A-continued

|  |  | 2nd Embodiment |  |  |  |  |  |
|  |  | f = 2.59 mm, Fno = 1.85, HFOV = 75.2 deg. |  |  |  |  |  |

| Surface # |  | Curvature Radius |  | Thickness | Material | Index | Abbe # | Focal Length |
| --- | --- | --- | --- | --- | --- | --- | --- | --- |
| 4 |  | 3.9251 | ASP | 1.976 |  |  |  |  |
| 5 | Lens 3 | 9.9999 | ASP | 1.776 | Glass | 1.821 | 24.1 | 11.15 |
| 6 |  | −100.0000 | ASP | 0.678 |  |  |  |  |
| 7 | Ape. Stop | Plano |  | 0.130 |  |  |  |  |
| 8 | Lens 4 | 100.0000 | ASP | 3.783 | Glass | 1.619 | 63.9 | 10.58 |
| 9 |  | −6.9024 | ASP | 0.143 |  |  |  |  |
| 10 | Lens 5 | 8.8744 | ASP | 5.000 | Glass | 1.619 | 63.9 | 3.33 |
| 11 |  | −2.1025 | ASP | 0.005 | Cemented | 1.550 | 43.9 | — |
| 12 | Lens 6 | −2.0957 | ASP | 1.776 | Glass | 1.821 | 24.1 | −4.81 |
| 13 |  | −6.1742 | ASP | 0.674 |  |  |  |  |
| 14 | Filter | Plano |  | 0.900 | Glass | 1.517 | 64.2 | — |
| 15 |  | Plano |  | 3.502 |  |  |  |  |
| 16 | Image | Plano |  | — |  |  |  |  |

Reference wavelength is 587.6 nm (d-line).

20

TABLE 2B

| Aspheric Coefficients |  |  |  |  |
|  |  |  |  |  |

| Surface # | 1 | 2 | 3 | 4 |
| --- | --- | --- | --- | --- |
| k = | 1.02968E+00 | −9.30480E−01 | 1.43106E+01 | −2.03877E−01 |
| A4 = | 8.00167E−04 | 1.28150E−03 | 2.31269E−03 | 8.89687E−03 |
| A6 = | −4.39398E−05 | 6.31859E−05 | −7.58669E−04 | −1.30195E−03 |
| A8 = | 1.23002E−06 | −5.73831E−06 | 6.70962E−05 | 2.49327E−04 |
| A10 = | −1.63984E−08 | 4.83682E−08 | −2.63361E−06 | −3.64936E−05 |
| A12 = | 9.03367E−11 | 9.32418E−09 | 3.93897E−08 | 2.70274E−06 |

| Surface # | 5 | 6 | 8 | 9 |
| --- | --- | --- | --- | --- |
| k = | 4.16480E+00 | −9.90000E+01 | 9.90000E+01 | −1.16760E+00 |
| A4 = | 4.44233E−02 | 8.33503E−03 | 6.45710E−03 | 8.62677E−05 |
| A6 = | 2.70443E−04 | 3.85674E−04 | 5.99776E−05 | 4.87066E−05 |
| A8 = | −4.45049E−05 | 3.17246E−05 | −3.05085E−05 | 1.56383E−05 |
| A10 = | 2.57216E−06 | −1.56000E−05 | 6.42521E−08 | −3.29720E−06 |
| A12 = | 1.17308E−07 | 1.77182E−06 | 1.65156E−07 | 1.82946E−07 |

| Surface # | 10 | 11 | 12 | 13 |
| --- | --- | --- | --- | --- |
| k = | 5.10431E−01 | −9.52313E−01 | −9.15598E−01 | −5.57991E+00 |
| A4 = | −1.34395E−04 | −5.66412E−03 | 8.12233E−04 | −3.55946E−05 |
| A6 = | 1.23328E−04 | −2.96659E−03 | −9.34998E−04 | 5.05777E−05 |
| A8 = | −1.00954E−05 | 8.62589E−04 | 1.26424E−04 | −7.72231E−06 |
| A10 = | 4.24255E−07 | −7.33884E−05 | −5.23531E−06 | 7.38664E−07 |
| A12 = | −1.78285E−08 | 2.08225E−06 | 5.50658E−08 | −2.01227E−08 |

In the 2nd embodiment, the equation of the aspheric surface profiles of the aforementioned lens elements is the same as the equation of the 1st embodiment. Further, the definitions of these parameters shown in Table 2C are the same as those stated in the 1st embodiment, so an explanation in this regard will not be provided again.

Moreover, these parameters can be calculated from Table 2A and Table 2B as the values and satisfy the conditions in Table 2C:

TABLE 2C

| 2nd Embodiment |  |  |  |
| --- | --- | --- | --- |
| f [mm] | 2.59 | TL/EPD | 18.10 |
| Fno | 1.85 | TL/ImgH | 5.48 |
| HFOV [degrees] | 75.2 | ΣCT/ΣAT | 2.10 |
| Nmax | 1.821 | R1/R2 | 4.26 |
| Nmin | 1.619 | R4/CT2 | 5.61 |

TABLE 2C-continued

| 2nd Embodiment |  |  |  |
| --- | --- | --- | --- |
| (V4 + V5)/(V3 + V6) | 2.65 | R8/R9 | −0.78 |
| (CT2 + CT3 + CT4 + CT5 + CT6)/CT1 | 18.62 | R10/R11 | 1.00 |
| (CT3 + CT4)/T34 | 6.88 | \|f/f3\| | 0.23 |
| T12/(CT1 + CT2) | 2.57 | f1/f2 | 0.83 |
| T12/CT1 | 5.14 | f2/CT2 | −10.70 |
| T23/T34 | 2.45 | f56/f4 | 0.95 |
| T45/T56 | 28.60 | Y11/ImgH | 1.59 |

3rd Embodiment

Figure 5:
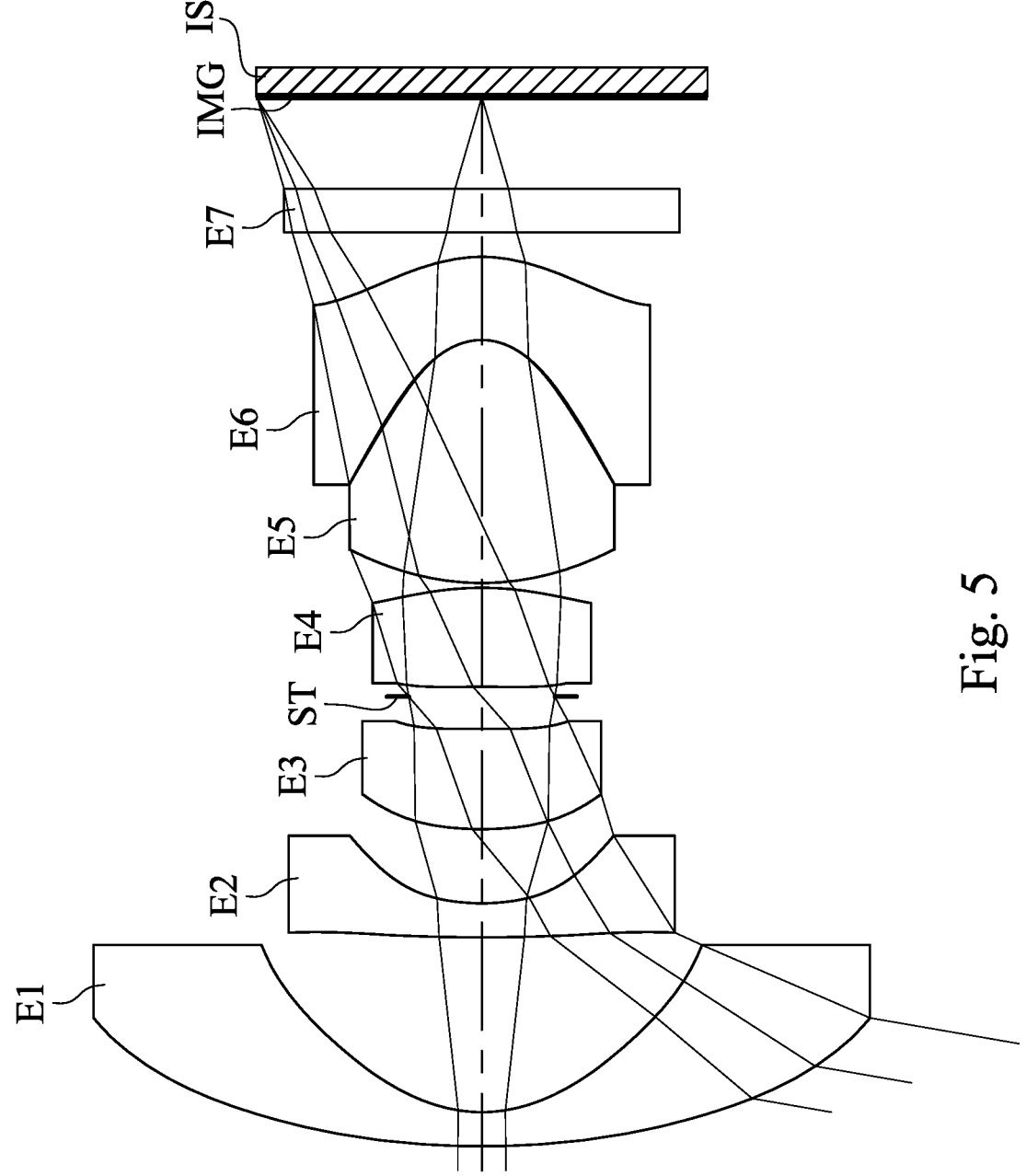
FIG. 5 is a schematic view of an image apparatus according to the 3rd embodiment of the present disclosure.
Figure 6:
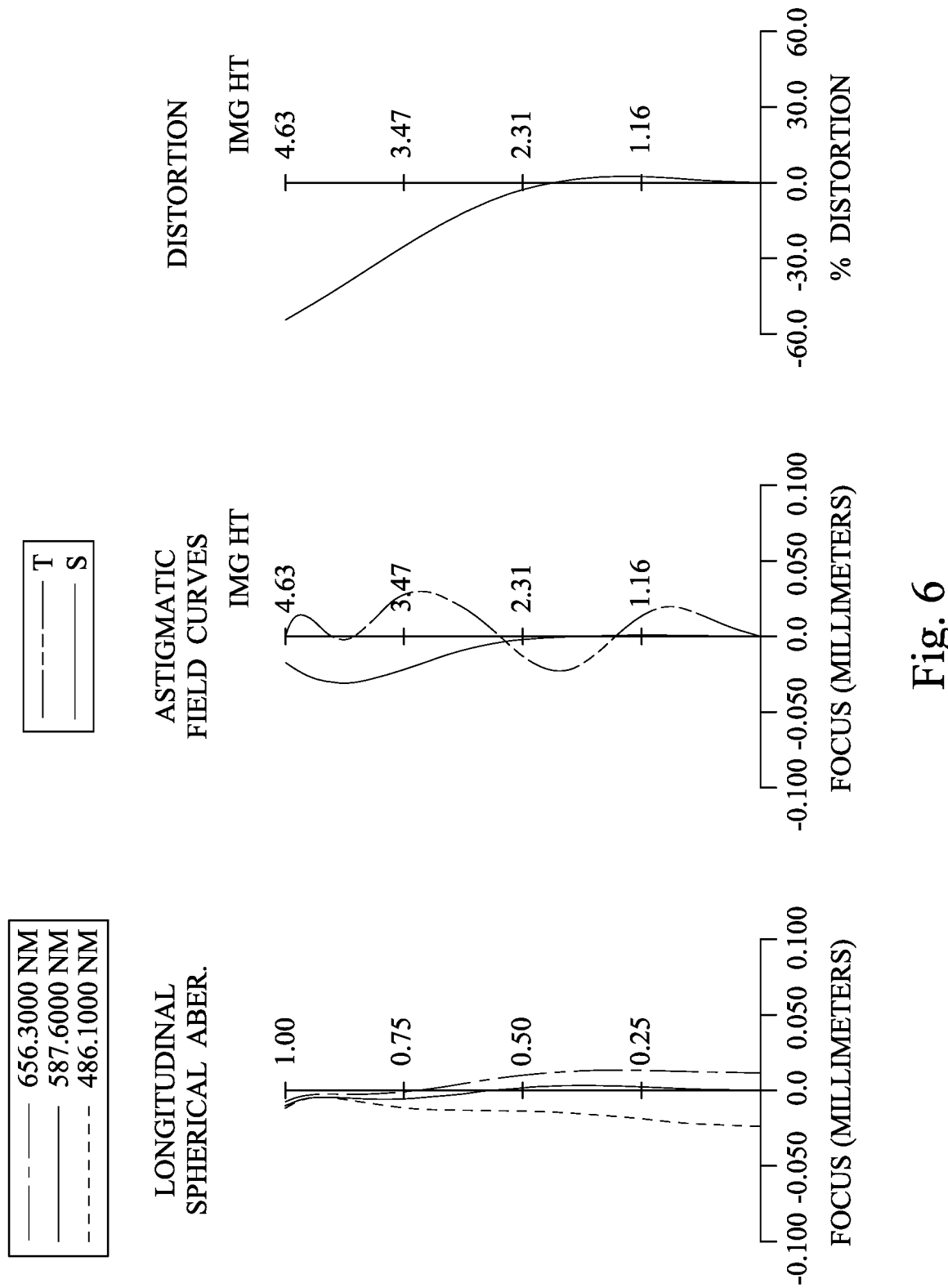
FIG. 6 shows spherical aberration curves, astigmatic field curves and a distortion curve of the 3rd embodiment.

FIG. 5 is a schematic view of an image apparatus 3 according to the 3rd embodiment of the present disclosure, and FIG. 6 shows spherical aberration curves, astigmatic field curves and a distortion curve of the 3rd embodiment.

As shown in FIG. 5, the image apparatus 3 of the 3rd embodiment includes an image lens assembly (reference number is omitted) and an image sensor IS. The image lens assembly includes, in order from an object side to an image side along an optical path, a first lens element E1, a second lens element E2, a third lens element E3, an aperture stop ST, a fourth lens element E4, a fifth lens element E5, a sixth lens element E6, a filter E7 and an image surface IMG. The image sensor IS is disposed on the image surface IMG of the image lens assembly, wherein the image lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of a glass material and has the object-side surface and the image-side surface being both aspheric. Further, the object-side surface of the second lens element E2 includes two inflection points.

The third lens element E3 with positive refractive power has an object-side surface being convex in a paraxial region thereof and an image-side surface being plane in a paraxial region thereof. The third lens element E3 is made of a glass material and has the object-side surface and the image-side surface being both aspheric. Further, the object-side surface of the third lens element E3 includes one inflection point.

The fourth lens element E4 with positive refractive power has an object-side surface being concave in a paraxial region thereof and an image-side surface being convex in a paraxial region thereof. The fourth lens element E4 is made of a glass material and has the object-side surface and the image-side surface being both aspheric. Further, the object-side surface of the fourth lens element E4 includes one inflection point, and the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a glass material and has the object-side surface and the image-side surface being both aspheric.

The sixth lens element E6 with negative refractive power has an object-side surface being concave in a paraxial region thereof and an image-side surface being convex in a paraxial region thereof. The sixth lens element E6 is made of a glass material and has the object-side surface and the image-side surface being both aspheric. Further, the image-side surface of the sixth lens element E6 includes one inflection point. Furthermore, the image-side surface of the fifth lens element E5 and the object-side surface of the sixth lens element E6 are adhesive to each other so as to form a cemented lens.

The filter E7 is made of a glass material, which is disposed between the sixth lens element E6 and the image surface IMG and will not affect the focal length of the image lens assembly.

The detailed optical data of the 3rd embodiment are shown in Table 3A, and the aspheric surface data are shown in Table 3B below.

TABLE 3A

| 3rd Embodiment f = 1.77 mm, Fno = 1.79, HFOV = 80.2 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 19.9588 | ASP | 0.700 | Glass | 1.806 | 40.7 | −4.53 |
| 2 | | 3.0407 | ASP | 3.600 | | | | |
| 3 | Lens 2 | 40.0821 | ASP | 0.700 | Glass | 1.693 | 53.2 | −7.34 |
| 4 | | 4.4819 | ASP | 1.527 | | | | |
| 5 | Lens 3 | 6.7687 | ASP | 2.065 | Glass | 1.821 | 24.1 | 8.24 |
| 6 | | Infinity | ASP | 0.665 | | | | |
| 7 | Ape. Stop | Plano | | 0.203 | | | | |
| 8 | Lens 4 | −28.0476 | ASP | 2.037 | Glass | 1.619 | 63.9 | 13.38 |
| 9 | | −6.5712 | ASP | 0.100 | | | | |
| 10 | Lens 5 | 5.3880 | ASP | 5.000 | Glass | 1.619 | 63.9 | 2.54 |
| 11 | | −1.4333 | ASP | 0.005 | Cemented | 1.550 | 43.9 | — |
| 12 | Lens 6 | −1.2862 | ASP | 1.711 | Glass | 1.821 | 24.1 | −4.18 |
| 13 | | −3.2891 | ASP | 0.502 | | | | |
| 14 | Filter | Plano | | 0.900 | Glass | 1.517 | 64.2 | — |
| 15 | | Plano | | 1.900 | | | | |
| 16 | Image | Plano | | — | | | | |

Reference wavelength is 587.6 nm (d-line).

TABLE 3B

| Aspheric Coefficients | | | | |
|---|---|---|---|---|
| Surface # | 1 | 2 | 3 | 4 |
| k = | 1.00631E+00 | −1.29457E+00 | 3.90819E+01 | 8.00711E−02 |
| A4 = | 7.06393E−04 | −2.09449E−04 | −4.93691E−04 | 1.07149E−02 |

TABLE 3B-continued

| Aspheric Coefficients | | | |
| --- | --- | --- | --- |
| A6 = | −4.02987E−05 | 2.03316E−04 | 2.89405E−04 | −1.06544E−03 |
| A8 = | 1.12481E−06 | −2.52074E−05 | −4.95340E−05 | 8.55361E−04 |
| A10 = | −1.41897E−08 | 1.07737E−06 | 2.81433E−06 | −1.83400E−04 |
| A12 = | 7.17527E−11 | −8.47552E−09 | −5.29771E−08 | 1.11169E−05 |

| Surface # | 5 | 6 | 8 | 9 |
| --- | --- | --- | --- | --- |
| k = | 2.28248E+00 | 0.00000E+00 | −9.90000E+01 | −2.86842E+00 |
| A4 = | 6.00305E−03 | 1.26549E−02 | 1.32964E−02 | 5.78122E−04 |
| A6 = | 2.17414E−04 | 8.34904E−04 | 3.39468E−04 | 2.22485E−04 |
| A8 = | 3.32450E−05 | 1.89381E−04 | −1.01824E−04 | −3.21938E−05 |
| A10 = | −9.59681E−06 | 4.91127E−05 | 8.83683E−06 | 4.25308E−06 |
| A12 = | −4.74206E−07 | −2.73829E−05 | −6.85641E−07 | 9.05699E−07 |

| Surface # | 10 | 11 | 12 | 13 |
| --- | --- | --- | --- | --- |
| k = | −5.46009E−01 | −9.27552E−01 | −9.52054E−01 | −3.55332E+00 |
| A4 = | −6.64240E−04 | −8.98583E−02 | −3.11250E−02 | −3.58892E−03 |
| A6 = | 2.12001E−04 | 3.39579E−02 | 1.11076E−02 | 1.03849E−03 |
| A8 = | −5.66431E−05 | −5.71415E−03 | −1.63165E−03 | −9.82198E−05 |
| A10 = | 8.20651E−06 | 4.91001E−04 | 1.30048E−04 | 5.60456E−06 |
| A12 = | −4.65049E−07 | −1.70026E−05 | −4.29530E−06 | −1.33233E−07 |

In the 3rd embodiment, the equation of the aspheric surface profiles of the aforementioned lens elements is the same as the equation of the 1st embodiment. Further, the definitions of these parameters shown in Table 3C are the same as those stated in the 1st embodiment, so an explanation in this regard will not be provided again.

Moreover, these parameters can be calculated from Table 3A and Table 3B as the values and satisfy the conditions in Table 3C:

TABLE 3C

| 3rd Embodiment | | | |
| --- | --- | --- | --- |
| f [mm] | 1.77 | TL/EPD | 21.89 |
| Fno | 1.79 | TL/ImgH | 4.67 |
| HFOV [degrees] | 80.2 | ΣCT/ΣAT | 2.00 |
| Nmax | 1.821 | R1/R2 | 6.56 |
| Nmin | 1.619 | R4/CT2 | 6.40 |
| (V4 + V5)/(V3 + V6) | 2.65 | R8/R9 | −1.22 |
| (CT2 + CT3 + CT4 + CT5 + CT6)/CT1 | 16.45 | R10/R11 | 1.11 |
| (CT3 + CT4)/T34 | 4.73 | |f/f3| | 0.21 |
| T12/(CT1 + CT2) | 2.57 | f1/f2 | 0.62 |
| T12/CT1 | 5.14 | f2/CT2 | −10.48 |
| T23/T34 | 1.76 | f56/f4 | 0.44 |
| T45/T56 | 20.00 | Y11/ImgH | 1.73 |

4th Embodiment

Figure 7:
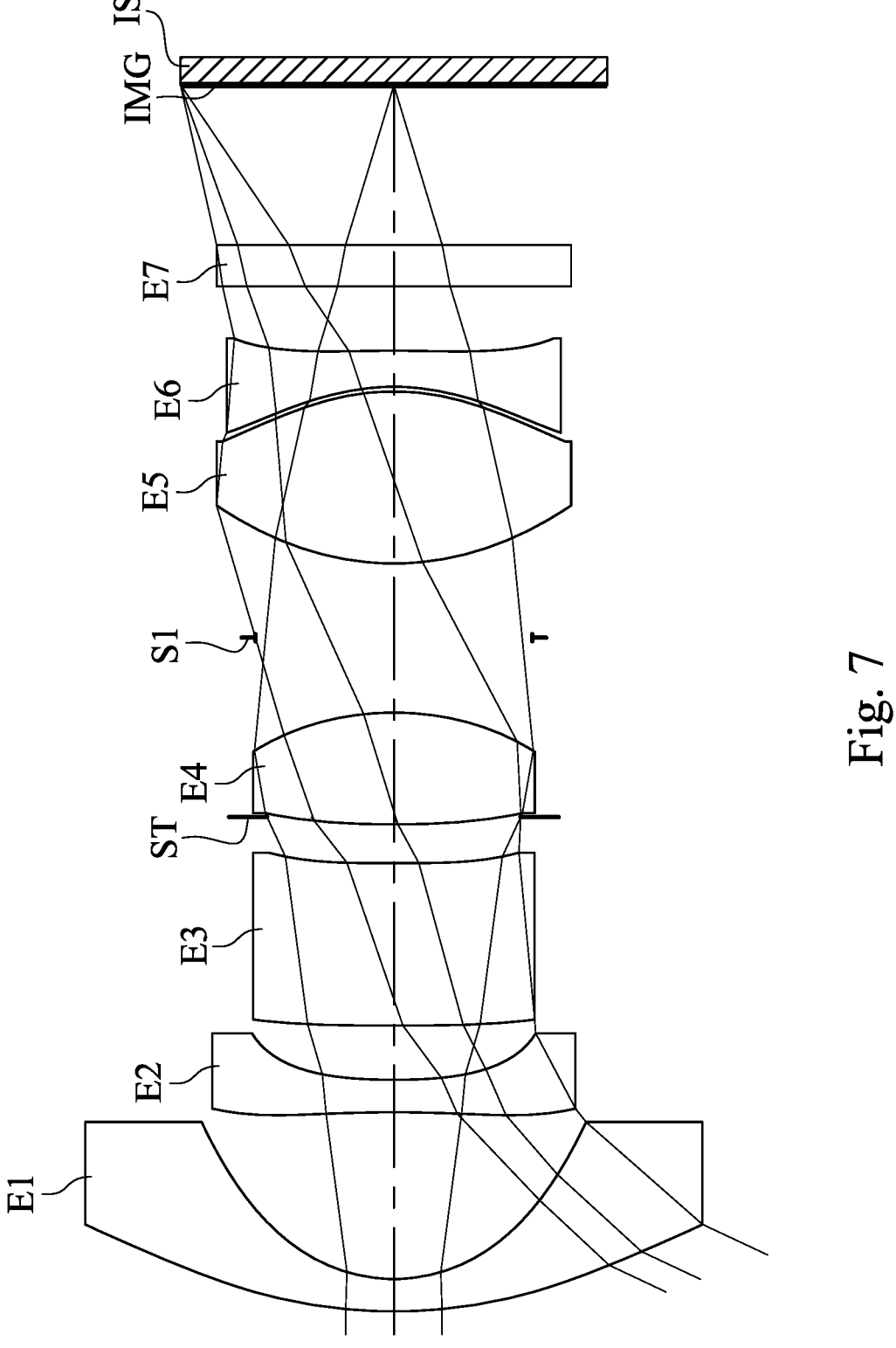
FIG. 7 is a schematic view of an image apparatus according to the 4th embodiment of the present disclosure.
Figure 8:
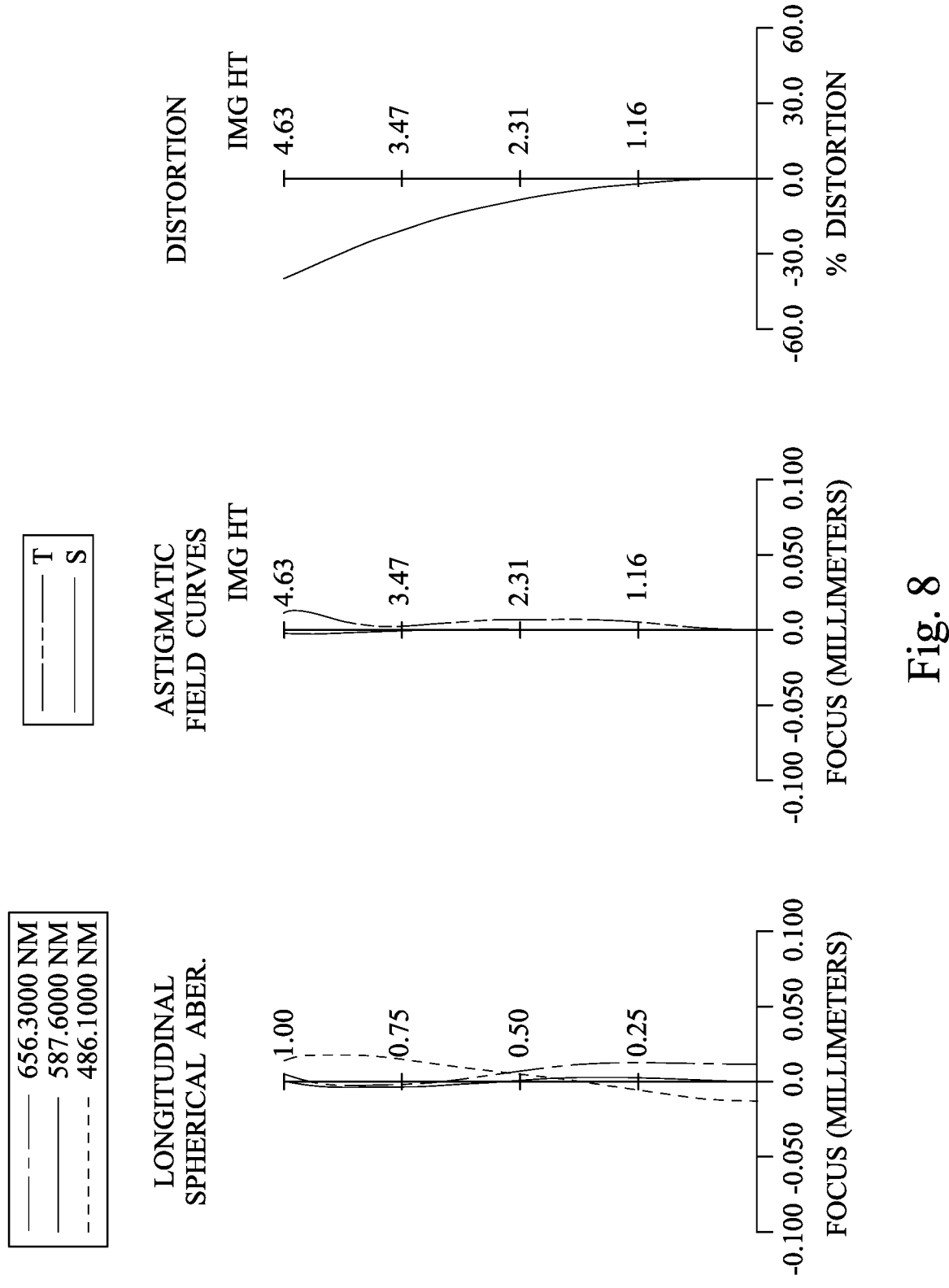
FIG. 8 shows spherical aberration curves, astigmatic field curves and a distortion curve of the 4th embodiment.

FIG. 7 is a schematic view of an image apparatus 4 according to the 4th embodiment of the present disclosure, and FIG. 8 shows spherical aberration curves, astigmatic field curves and a distortion curve of the 4th embodiment. As shown in FIG. 7, the image apparatus 4 of the 4th embodiment includes an image lens assembly (reference number is omitted) and an image sensor IS. The image lens assembly includes, in order from an object side to an image side along an optical path, a first lens element E1, a second lens element E2, a third lens element E3, an aperture stop ST, a fourth lens element E4, a stop S1, a fifth lens element E5, a sixth lens element E6, a filter E7 and an image surface IMG. The image sensor IS is disposed on the image surface IMG of the image lens assembly, wherein the image lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a glass material and has the object-side surface and the image-side surface being both aspheric.

The second lens element E2 with negative refractive power has an object-side surface being concave in a paraxial region thereof and an image-side surface being concave in a paraxial region thereof. The second lens element E2 is made of a glass material and has the object-side surface and the image-side surface being both aspheric. Further, the object-side surface of the second lens element E2 includes two inflection points.

The third lens element E3 with negative refractive power has an object-side surface being concave in a paraxial region thereof and an image-side surface being concave in a paraxial region thereof. The third lens element E3 is made of a glass material and has the object-side surface and the image-side surface being both aspheric. Further, the object-side surface of the third lens element E3 includes two inflection points.

The fourth lens element E4 with positive refractive power has an object-side surface being convex in a paraxial region thereof and an image-side surface being convex in a paraxial region thereof. The fourth lens element E4 is made of a glass material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of a glass material and has the object-side surface and the image-side surface being both aspheric. Further, the image-side surface of the fifth lens element E5 includes one inflection point.

The sixth lens element E6 with negative refractive power has an object-side surface being concave in a paraxial region thereof and an image-side surface being convex in a paraxial region thereof. The sixth lens element E6 is made of a glass material and has the object-side surface and the image-side surface being both aspheric. Further, the object-side surface of the sixth lens element E6 includes one inflection point, and the image-side surface of the sixth lens element E6 includes one inflection point.

The filter E7 is made of a glass material, which is disposed between the sixth lens element E6 and the image surface IMG and will not affect the focal length of the image lens assembly.

The detailed optical data of the 4th embodiment are shown in Table 4A, and the aspheric surface data are shown in Table 4B below.

TABLE 4A

| | | | | | | | | Focal |
|---|---|---|---|---|---|---|---|---|
| | | | 4th Embodiment | | | | | |
| | | | $f = 3.62$ mm, Fno = 1.73, HFOV = 64.9 deg. | | | | | |
| Surface # | | Curvature Radius | | Thickness | Material | Index | Abbe # | Focal Length |
| 0 | Object | Plano | | Infinity | | | | |
| 1 | Lens 1 | 11.4189 | ASP | 0.700 | Glass | 1.619 | 63.9 | −8.47 |
| 2 | | 3.5071 | ASP | 3.620 | | | | |
| 3 | Lens 2 | −25.1389 | ASP | 0.700 | Glass | 1.619 | 63.9 | −13.85 |
| 4 | | 13.1452 | ASP | 1.182 | | | | |
| 5 | Lens 3 | −507.6142 | ASP | 3.520 | Glass | 1.822 | 24.0 | −190.67 |
| 6 | | 227.3132 | ASP | 1.000 | | | | |
| 7 | Ape. Stop | Plano | | −0.158 | | | | |
| 8 | Lens 4 | 29.0259 | ASP | 2.423 | Glass | 1.619 | 63.9 | 8.68 |
| 9 | | −6.3828 | ASP | 1.624 | | | | |
| 10 | Stop | Plano | | 1.611 | | | | |
| 11 | Lens 5 | 6.0369 | ASP | 3.726 | Glass | 1.619 | 63.9 | 5.38 |
| 12 | | −5.6688 | ASP | 0.107 | | | | |
| 13 | Lens 6 | −5.0527 | ASP | 0.781 | Glass | 1.822 | 24.0 | −7.35 |
| 14 | | −33.0945 | ASP | 1.394 | | | | |
| 15 | Filter | Plano | | 0.900 | Glass | 1.517 | 64.2 | — |
| 16 | | Plano | | 3.471 | | | | |
| 17 | Image | Plano | | — | | | | |

Reference wavelength is 587.6 nm (d-line).
Effective radius of Surface 10 (stop S1) is 3.000 mm.

TABLE 4B

| | | Aspheric Coefficients | | |
|---|---|---|---|---|
| Surface # | 1 | 2 | 3 | 4 |
| k = | −8.83976E−01 | −9.24268E−01 | −4.99115E+01 | 2.96739E+00 |
| A4 = | 4.18825E−04 | 2.10024E−03 | 1.54745E−03 | 5.78138E−03 |
| A6 = | −2.25991E−05 | 5.24029E−05 | −1.53464E−04 | −2.73008E−04 |
| A8 = | 4.45628E−07 | −4.89701E−07 | 2.00724E−05 | 4.99801E−05 |
| A10 = | −5.72177E−09 | 1.20714E−07 | −8.34355E−07 | −3.58594E−06 |
| A12 = | 4.12846E−11 | −7.21376E−09 | 8.15067E−09 | 3.38399E−07 |
| Surface # | 5 | 6 | 8 | 9 |
| k = | 9.90000E+01 | −9.90000E+01 | −4.68655E+01 | 2.31215E−01 |
| A4 = | 3.04818E−03 | 5.50560E−03 | 3.73680E−03 | −7.34828E−04 |
| A6 = | −1.94138E−04 | −2.17785E−04 | −3.15696E−04 | −1.09412E−05 |
| A8 = | −3.08655E−06 | −1.67197E−06 | 1.68184E−05 | 4.51110E−06 |
| A10 = | 1.46436E−06 | 2.49895E−07 | −7.53809E−07 | −4.97327E−07 |
| A12 = | −7.62976E−08 | −1.96984E−09 | 2.52131E−08 | 2.22443E−08 |
| Surface # | 11 | 12 | 13 | 14 |
| k = | −7.44228E−01 | −1.22812E+00 | −1.10639E+00 | −2.53506E+01 |
| A4 = | −2.03196E−04 | −2.13772E−03 | 1.58994E−03 | 4.52000E−03 |
| A6 = | 2.68268E−05 | 4.70569E−04 | −1.21147E−05 | −2.97708E−04 |
| A8 = | −4.13167E−07 | −3.50695E−05 | −3.19657E−06 | 1.83828E−05 |
| A10 = | −1.29408E−08 | 1.39192E−06 | 4.98654E−07 | −4.31454E−07 |
| A12 = | −1.05439E−09 | −2.11580E−08 | −1.19867E−08 | 9.76729E−09 |

In the 4th embodiment, the equation of the aspheric surface profiles of the aforementioned lens elements is the same as the equation of the 1st embodiment. Further, the definitions of these parameters shown in Table 4C are the same as those stated in the 1st embodiment, so an explanation in this regard will not be provided again.

Moreover, these parameters can be calculated from Table 4A and Table 4B as the values and satisfy the conditions in Table 4C:

TABLE 4C

| 4th Embodiment | | | |
|---|---|---|---|
| f [mm] | 3.62 | TL/EPD | 12.72 |
| Fno | 1.73 | TL/ImgH | 5.75 |
| HFOV [degrees] | 64.9 | ΣCT/ΣAT | 1.32 |
| Nmax | 1.822 | R1/R2 | 3.26 |
| Nmin | 1.619 | R4/CT2 | 18.78 |
| (V4 + V5)/(V3 + V6) | 2.66 | R8/R9 | −1.06 |
| (CT2 + CT3 + CT4 + CT5 + CT6)/CT1 | 15.93 | R10/R11 | 1.12 |
| (CT3 + CT4)/T34 | 7.06 | \|f/f3\| | 0.02 |
| T12/(CT1 + CT2) | 2.59 | f1/f2 | 0.61 |
| T12/CT1 | 5.17 | f2/CT2 | −19.79 |
| T23/T34 | 1.40 | f56/f4 | 1.39 |
| T45/T56 | 30.23 | Y11/ImgH | 1.45 |

5th Embodiment

Figure 9:
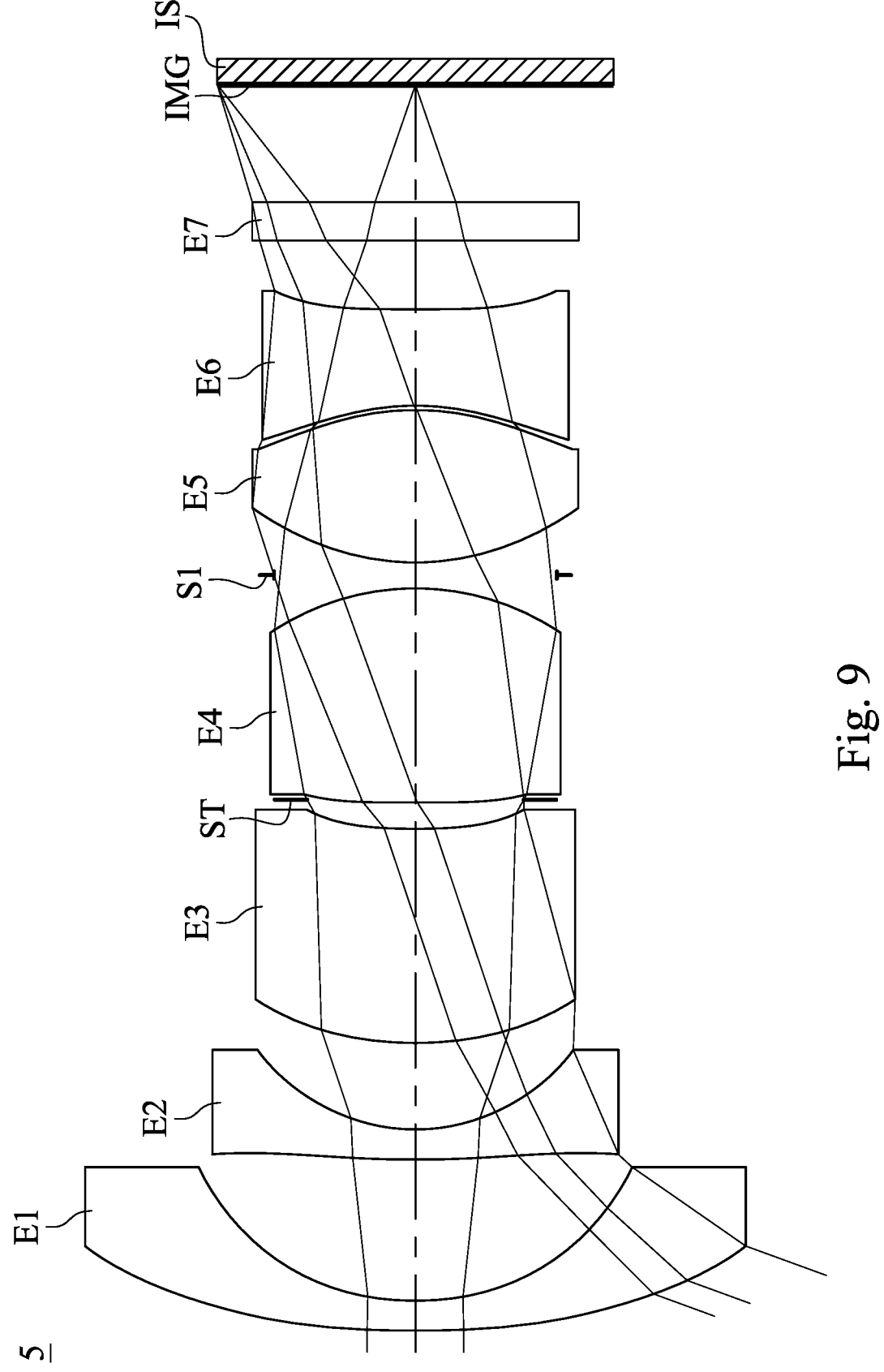
FIG. 9 is a schematic view of an image apparatus according to the 5th embodiment of the present disclosure.
Figure 10:
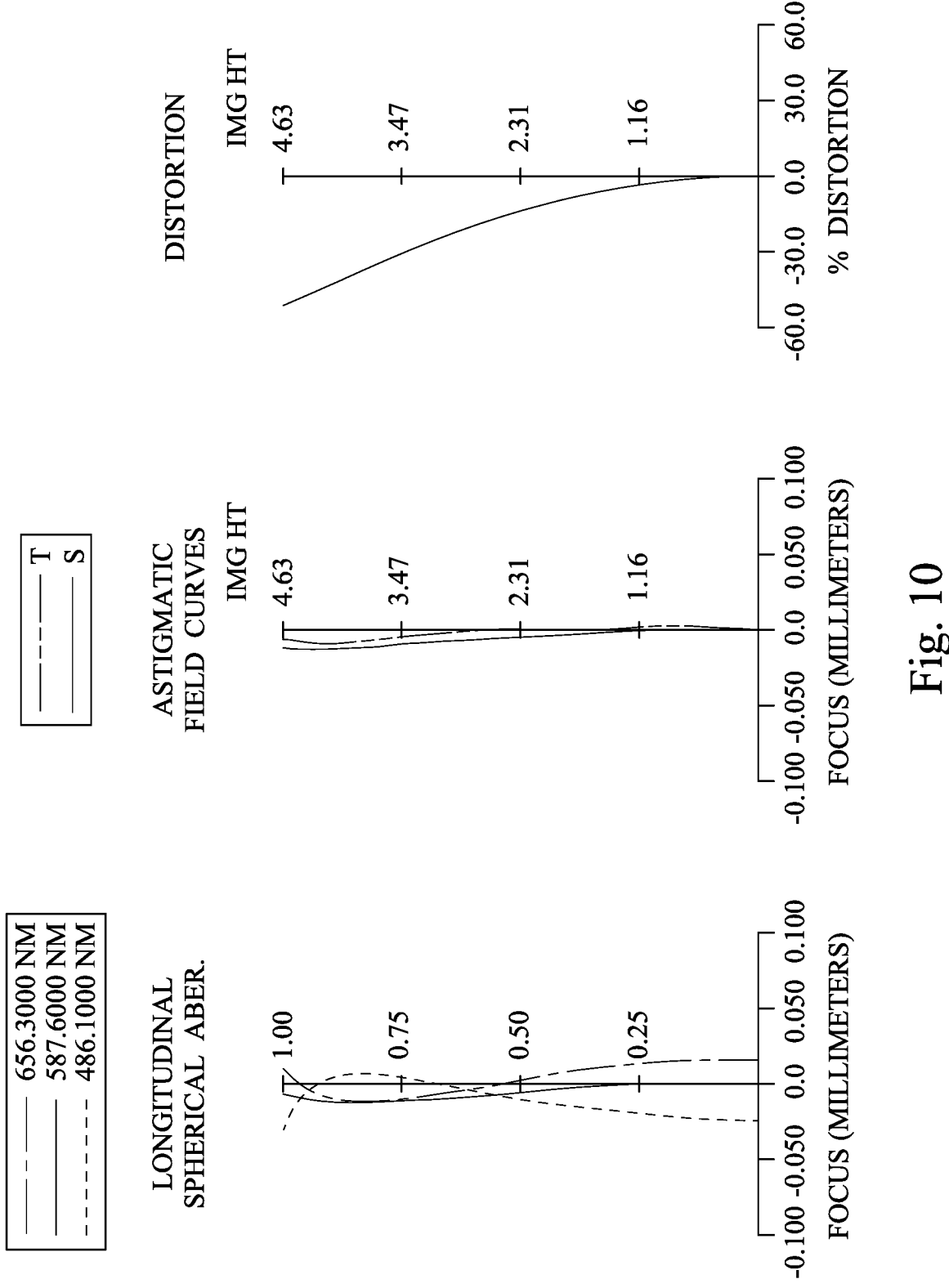
FIG. 10 shows spherical aberration curves, astigmatic field curves and a distortion curve of the 5th embodiment.

FIG. 9 is a schematic view of an image apparatus 5 according to the 5th embodiment of the present disclosure, and FIG. 10 shows spherical aberration curves, astigmatic field curves and a distortion curve of the 5th embodiment. As shown in FIG. 9, the image apparatus 5 of the 5th embodiment includes an image lens assembly (reference number is omitted) and an image sensor IS. The image lens assembly includes, in order from an object side to an image side along an optical path, a first lens element E1, a second lens element E2, a third lens element E3, an aperture stop ST, a fourth lens element E4, a stop S1, a fifth lens element E5, a sixth lens element E6, a filter E7 and an image surface IMG. The image sensor IS is disposed on the image surface IMG of the image lens assembly, wherein the image lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of a glass material and has the object-side surface and the image-side surface being both aspheric. Further, the object-side surface of the second lens element E2 includes one inflection point.

The third lens element E3 with positive refractive power has an object-side surface being convex in a paraxial region thereof and an image-side surface being concave in a paraxial region thereof. The third lens element E3 is made of a glass material and has the object-side surface and the image-side surface being both aspheric.

The fourth lens element E4 with positive refractive power has an object-side surface being plane in a paraxial region thereof and an image-side surface being convex in a paraxial region thereof. The fourth lens element E4 is made of a glass material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of a glass material and has the object-side surface and the image-side surface being both aspheric. Further, the image-side surface of the fifth lens element E5 includes one inflection point.

The sixth lens element E6 with negative refractive power has an object-side surface being concave in a paraxial region thereof and an image-side surface being concave in a paraxial region thereof. The sixth lens element E6 is made of a glass material and has the object-side surface and the image-side surface being both aspheric. Further, the object-side surface of the sixth lens element E6 includes one inflection point.

The filter E7 is made of a glass material, which is disposed between the sixth lens element E6 and the image surface IMG and will not affect the focal length of the image lens assembly.

The detailed optical data of the 5th embodiment are shown in Table 5A, and the aspheric surface data are shown in Table 5B below.

TABLE 5A

| 5th Embodiment f = 3.47 mm, Fno = 1.54, HFOV = 70.0 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 33.2766 | ASP | 0.700 | Glass | 1.806 | 40.7 | −10.91 |
| 2 | | 6.8929 | ASP | 3.300 | | | | |
| 3 | Lens 2 | 41.7735 | ASP | 0.700 | Glass | 1.619 | 63.9 | −8.59 |
| 4 | | 4.6829 | ASP | 2.018 | | | | |
| 5 | Lens 3 | 8.6079 | ASP | 5.000 | Glass | 1.821 | 24.1 | 18.17 |
| 6 | | 15.0219 | ASP | 0.681 | | | | |
| 7 | Ape. Stop | Plano | | −0.063 | | | | |
| 8 | Lens 4 | Infinity | ASP | 5.000 | Glass | 1.619 | 63.9 | 9.79 |
| 9 | | −6.0575 | ASP | 0.309 | | | | |
| 10 | Stop | Plano | | 0.296 | | | | |
| 11 | Lens 5 | 5.9776 | ASP | 3.555 | Glass | 1.619 | 63.9 | 5.77 |
| 12 | | −6.8484 | ASP | 0.106 | | | | |
| 13 | Lens 6 | −6.1324 | ASP | 2.251 | Glass | 1.821 | 24.1 | −7.21 |
| 14 | | 200.0000 | ASP | 1.609 | | | | |

TABLE 5A-continued

| | | 5th Embodiment<br>f = 3.47 mm, Fno = 1.54, HFOV = 70.0 deg. | | | | | |
| Surface # | | Curvature Radius | Thickness | Material | Index | Abbe # | Focal<br>Length |
|---|---|---|---|---|---|---|---|
| 15 | Filter | Plano | 0.900 | Glass | 1.517 | 64.2 | — |
| 16 | | Plano | 2.737 | | | | |
| 17 | Image | Plano | — | | | | |

Reference wavelength is 587.6 nm (d-line).
Effective radius of Surface 10 (stop S1) is 3.300 mm.

TABLE 5B

| | | Aspheric Coefficients | | |
| Surface # | 1 | 2 | 3 | 4 |
|---|---|---|---|---|
| k = | 1.40637E+01 | −8.06940E−01 | 0.00000E+00 | −1.50724E+00 |
| A4 = | 1.03307E−03 | 1.82272E−03 | 2.05855E−03 | 4.52277E−03 |
| A6 = | −4.27228E−05 | −1.36090E−05 | −3.60718E−04 | −4.58972E−04 |
| A8 = | 9.31663E−07 | 1.09724E−06 | 2.26030E−05 | 2.72774E−05 |
| A10 = | −1.01963E−08 | −1.14090E−07 | −6.64834E−07 | −2.97092E−08 |
| A12 = | 4.50427E−11 | 3.65124E−09 | 7.32687E−09 | −1.50237E−08 |
| Surface # | 5 | 6 | 8 | 9 |
| k = | 8.06815E−01 | 0.00000E+00 | 0.00000E+00 | −2.89641E−01 |
| A4 = | 7.35544E−04 | 4.90616E−03 | 4.08677E−03 | −2.71670E−04 |
| A6 = | −5.16986E−07 | 1.42814E−04 | 5.71805E−05 | 1.92462E−05 |
| A8 = | −1.60549E−06 | 1.15956E−05 | −2.20581E−07 | −1.91988E−06 |
| A10 = | 1.36219E−07 | −3.23849E−06 | −1.31464E−06 | 1.35599E−08 |
| A12 = | −3.37366E−09 | 1.21488E−07 | 4.89535E−08 | 2.59959E−09 |
| Surface # | 11 | 12 | 13 | 14 |
| k = | −4.24288E−01 | −1.20132E+00 | −2.09753E+00 | 0.00000E+00 |
| A4 = | −2.41022E−04 | −2.42557E−03 | 1.20481E−04 | 3.86482E−03 |
| A6 = | 3.34984E−05 | 4.97685E−04 | 2.23866E−04 | −4.81748E−05 |
| A8 = | −2.50529E−06 | −4.07427E−05 | −2.78994E−05 | −2.86601E−06 |
| A10 = | 9.63023E−08 | 1.90118E−06 | 1.73056E−06 | 4.74341E−07 |
| A12 = | −2.29171E−09 | −3.69375E−08 | −3.92414E−08 | −1.02499E−08 |

In the 5th embodiment, the equation of the aspheric surface profiles of the aforementioned lens elements is the same as the equation of the 1st embodiment. Further, the definitions of these parameters shown in Table 5C are the same as those stated in the 1st embodiment, so an explanation in this regard will not be provided again.

Moreover, these parameters can be calculated from Table 5A and Table 5B as the values and satisfy the conditions in Table 5C:

TABLE 5C

| | 5th Embodiment | | |
|---|---|---|---|
| f [mm] | 3.47 | TL/EPD | 12.92 |
| Fno | 1.54 | TL/ImgH | 6.29 |
| HFOV [degrees] | 70.0 | ΣCT/ΣAT | 2.59 |
| Nmax | 1.821 | R1/R2 | 4.83 |
| Nmin | 1.619 | R4/CT2 | 6.69 |
| (V4 + V5)/(V3 + V6) | 2.65 | R8/R9 | −1.01 |
| (CT2 + CT3 + CT4 + CT5 +<br>CT6)/CT1 | 23.58 | R10/R11 | 1.12 |
| (CT3 + CT4)/T34 | 16.18 | |f/f3| | 0.19 |
| T12/(CT1 + CT2) | 2.36 | f1/f2 | 1.27 |
| T12/CT1 | 4.71 | f2/CT2 | −12.26 |
| T23/T34 | 3.27 | f56/f4 | 1.47 |
| T45/T56 | 5.71 | Y11/ImgH | 1.67 |

6th Embodiment

Figure 11:
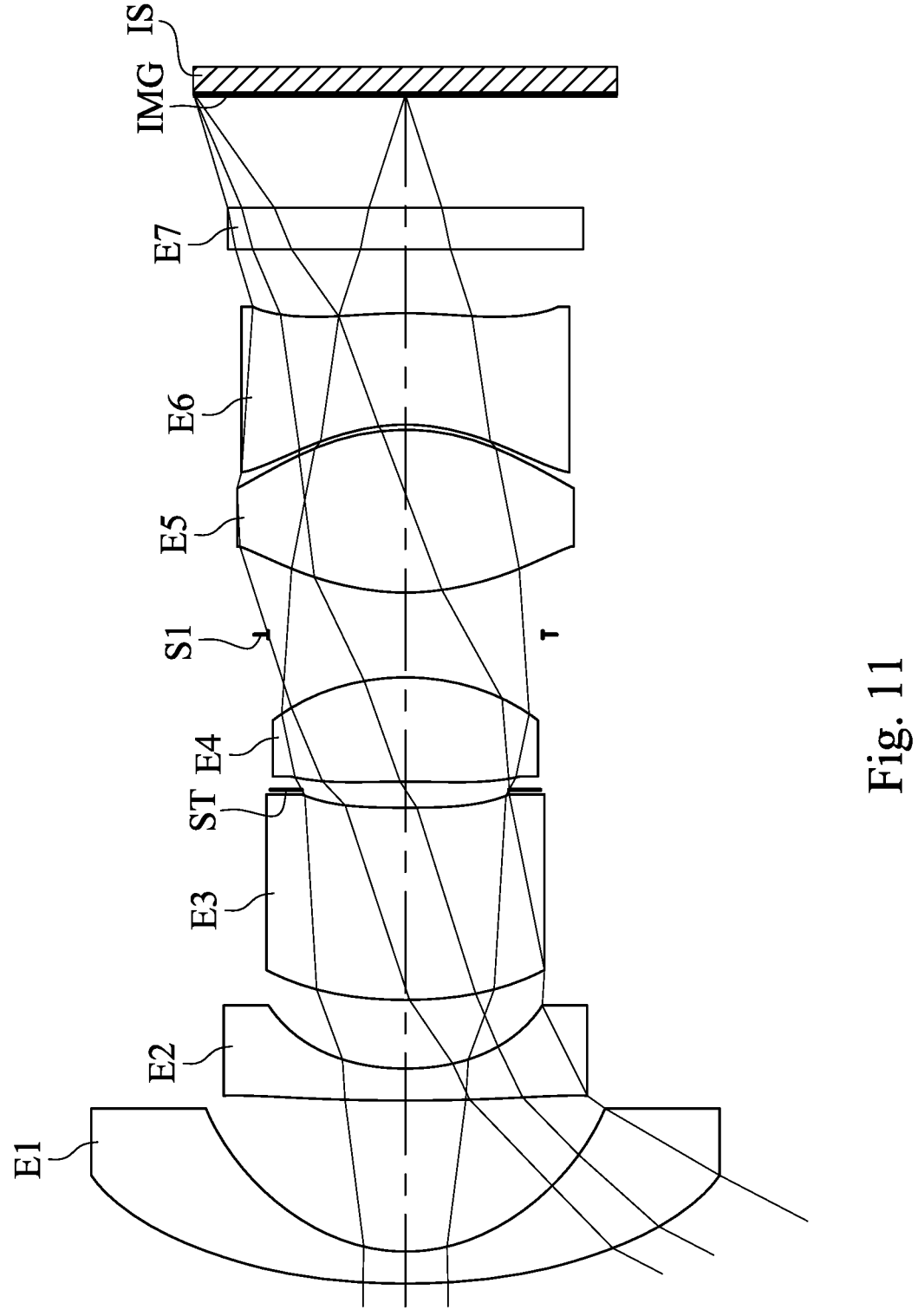
FIG. 11 is a schematic view of an image apparatus according to the 6th embodiment of the present disclosure.
Figure 12:
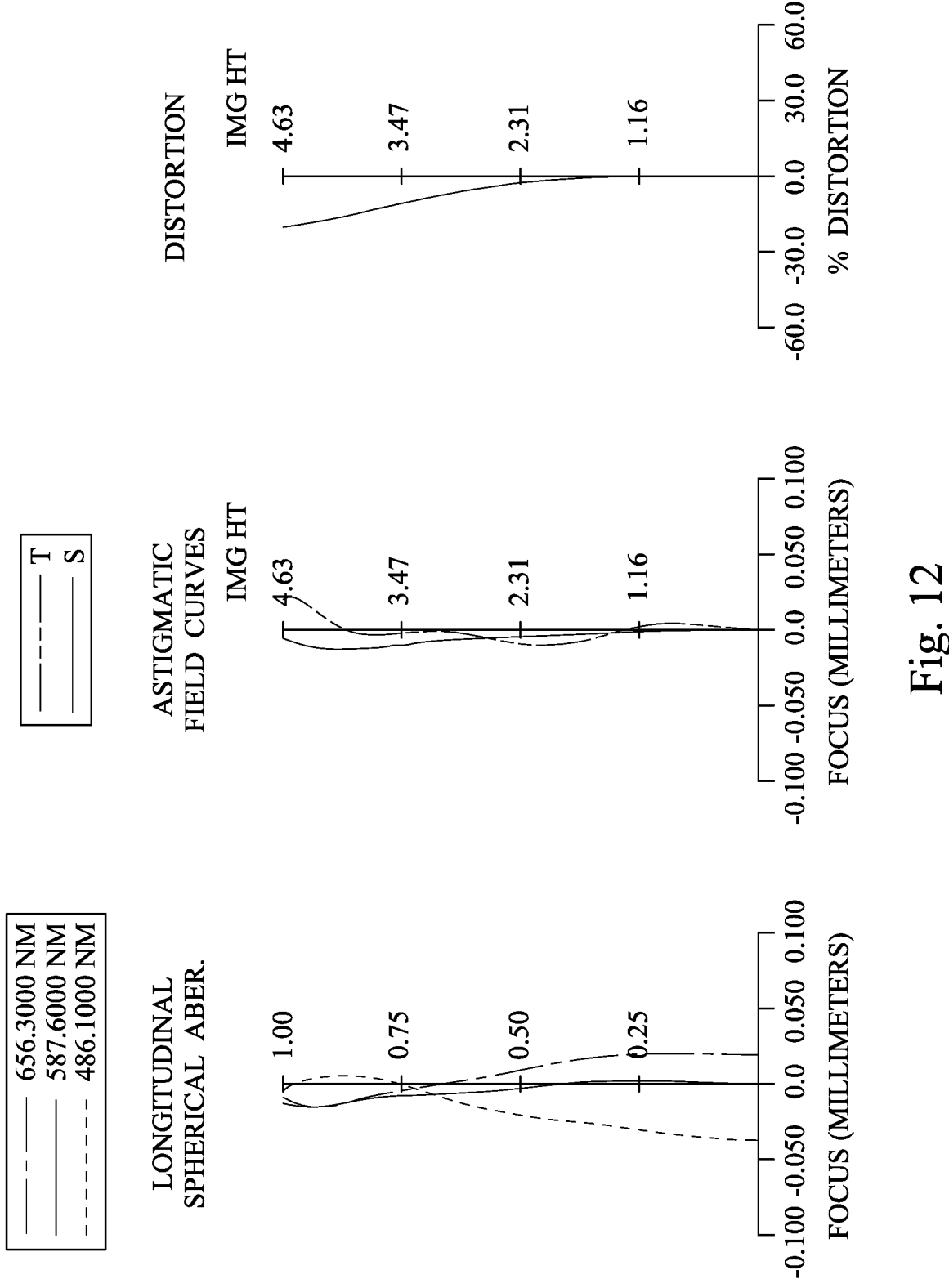
FIG. 12 shows spherical aberration curves, astigmatic field curves and a distortion curve of the 6th embodiment.

FIG. 11 is a schematic view of an image apparatus 6 according to the 6th embodiment of the present disclosure, and FIG. 12 shows spherical aberration curves, astigmatic field curves and a distortion curve of the 6th embodiment. As shown in FIG. 11, the image apparatus 6 of the 6th embodiment includes an image lens assembly (reference number is omitted) and an image sensor IS. The image lens assembly includes, in order from an object side to an image side along an optical path, a first lens element E1, a second lens element E2, a third lens element E3, an aperture stop ST, a fourth lens element E4, a stop S1, a fifth lens element E5, a sixth lens element E6, a filter E7 and an image surface IMG. The image sensor IS is disposed on the image surface IMG of the image lens assembly, wherein the image lens assembly includes six lens elements (E1, E2, E3, E4, E5, E6) without additional one or more lens elements inserted between the first lens element E1 and the sixth lens element E6.

The first lens element E1 with negative refractive power has an object-side surface being convex in a paraxial region thereof and an image-side surface being concave in a paraxial region thereof. The first lens element E1 is made of a glass material and has the object-side surface and the image-side surface being both aspheric.

The second lens element E2 with negative refractive power has an object-side surface being convex in a paraxial region thereof and an image-side surface being concave in a paraxial region thereof. The second lens element E2 is made of a glass material and has the object-side surface and the image-side surface being both aspheric. Further, the object-side surface of the second lens element E2 includes one inflection point.

The third lens element E3 with positive refractive power has an object-side surface being convex in a paraxial region thereof and an image-side surface being concave in a paraxial region thereof. The third lens element E3 is made of a glass material and has the object-side surface and the image-side surface being both aspheric.

The fourth lens element E4 with positive refractive power has an object-side surface being concave in a paraxial region thereof and an image-side surface being convex in a paraxial region thereof. The fourth lens element E4 is made of a glass material and has the object-side surface and the image-side surface being both aspheric. Further, the object-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a glass material and has the object-side surface and the image-side surface being both aspheric. Further, the object-side surface of the fifth lens element E5 includes one inflection point, and the image-side surface of the fifth lens element E5 includes one inflection point.

The sixth lens element E6 with negative refractive power has an object-side surface being concave in a paraxial region thereof and an image-side surface being convex in a paraxial region thereof. The sixth lens element E6 is made of a glass material and has the object-side surface and the image-side surface being both aspheric. Further, the object-side surface of the sixth lens element E6 includes one inflection point, and the image-side surface of the sixth lens element E6 includes one inflection point.

The filter E7 is made of a glass material, which is disposed between the sixth lens element E6 and the image surface IMG and will not affect the focal length of the image lens assembly.

The detailed optical data of the 6th embodiment are shown in Table 6A, and the aspheric surface data are shown in Table 6B below.

TABLE 6A

|  | | 6th Embodiment f = 3.02 mm, Fno = 1.63, HFOV = 62.5 deg. | | | | | | |
| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Lens 1 | 17.5684 | ASP | 0.700 | Glass | 1.693 | 53.2 | −7.43 |
| 2 | | 3.9203 | ASP | 3.300 | | | | |
| 3 | Lens 2 | 58.8766 | ASP | 0.700 | Glass | 1.693 | 53.2 | −8.73 |
| 4 | | 5.4617 | ASP | 1.499 | | | | |
| 5 | Lens 3 | 9.6259 | ASP | 4.200 | Glass | 1.821 | 24.1 | 16.57 |
| 6 | | 26.4418 | ASP | 0.391 | | | | |
| 7 | Ape. Stop | Plano | | 0.180 | | | | |
| 8 | Lens 4 | −32.9709 | ASP | 2.279 | Glass | 1.619 | 63.9 | 10.02 |
| 9 | | −5.3551 | ASP | 0.934 | | | | |
| 10 | Stop | Plano | | 0.921 | | | | |
| 11 | Lens 5 | 5.5823 | ASP | 3.552 | Glass | 1.619 | 63.9 | 5.05 |
| 12 | | −5.3737 | ASP | 0.119 | | | | |
| 13 | Lens 6 | −4.3128 | ASP | 2.435 | Glass | 1.821 | 24.1 | −9.86 |
| 14 | | −11.5740 | ASP | 1.399 | | | | |
| 15 | Filter | Plano | | 0.900 | Glass | 1.517 | 64.2 | — |
| 16 | | Plano | | 2.483 | | | | |
| 17 | Image | Plano | | — | | | | |

Reference wavelength is 587.6 nm (d-line).
Effective radius of Surface 10 (stop S1) is 3.000 mm.

TABLE 6B

| | Aspheric Coefficients | | | |
| --- | --- | --- | --- | --- |
| Surface # | 1 | 2 | 3 | 4 |
| k = | 5.02863E+00 | −1.25933E+00 | 0.00000E+00 | 5.20485E−01 |
| A4 = | 8.50470E−04 | 1.60811E−03 | 1.66394E−03 | 6.54493E−03 |
| A6 = | −5.03088E−05 | 3.35012E−05 | −3.93375E−04 | −6.37072E−04 |
| A8 = | 1.47123E−06 | −3.32058E−06 | 3.81201E−05 | 8.47441E−05 |
| A10 = | −2.11476E−08 | 1.06216E−09 | −1.69631E−06 | −7.31489E−06 |
| A12 = | 1.19826E−10 | 1.04702E−08 | 2.57924E−08 | 4.81430E−07 |

| Surface # | 5 | 6 | 8 | 9 |
| --- | --- | --- | --- | --- |
| k = | 1.88829E+00 | 0.00000E+00 | 0.00000E+00 | 9.06300E−02 |
| A4 = | 2.32648E−03 | 6.71712E−03 | 5.01872E−03 | −1.65774E−03 |
| A6 = | −9.92208E−05 | 2.12281E−04 | 2.12946E−04 | 1.26432E−04 |
| A8 = | 2.28829E−06 | 3.99017E−05 | −6.74401E−06 | −4.16758E−06 |

TABLE 6B-continued

| Aspheric Coefficients | | | |
|---|---|---|---|
| A10 = | −3.37111E−07 | −1.60030E−05 | −5.64343E−06 | −9.82497E−07 |
| A12 = | 3.30472E−08 | 9.96290E−07 | 3.75481E−07 | 6.36710E−08 |

| Surface # | 11 | 12 | 13 | 14 |
|---|---|---|---|---|
| k = | −1.13751E+00 | −6.81165E−01 | −1.51657E+00 | −3.66925E+01 |
| A4 = | −1.37942E−03 | −4.27513E−03 | 1.24270E−03 | 3.61670E−03 |
| A6 = | 1.37837E−04 | 7.45565E−04 | 1.81852E−04 | 1.90660E−04 |
| A8 = | −5.49154E−06 | −4.93187E−05 | −4.03423E−05 | −4.41329E−05 |
| A10 = | −1.11425E−07 | 1.50618E−06 | 3.47741E−06 | 2.99501E−06 |
| A12 = | −3.76722E−09 | −9.72893E−09 | −8.37160E−08 | −4.29785E−08 |

In the 6th embodiment, the equation of the aspheric surface profiles of the aforementioned lens elements is the same as the equation of the 1st embodiment. Further, the definitions of these parameters shown in Table 6C are the same as those stated in the 1st embodiment, so an explanation in this regard will not be provided again.

Moreover, these parameters can be calculated from Table 6A and Table 6B as the values and satisfy the conditions in Table 6C:

TABLE 6C

| 6th Embodiment | | | |
|---|---|---|---|
| f [mm] | 3.02 | TL/EPD | 14.01 |
| Fno | 1.63 | TL/ImgH | 5.62 |
| HFOV [degrees] | 62.5 | ΣCT/ΣAT | 1.89 |
| Nmax | 1.821 | R1/R2 | 4.48 |
| Nmin | 1.619 | R4/CT2 | 7.80 |
| (V4 + V5)/(V3 + V6) | 2.65 | R8/R9 | −0.96 |
| (CT2 + CT3 + CT4 + CT5 + CT6)/CT1 | 18.81 | R10/R11 | 1.25 |
| (CT3 + CT4)/T34 | 11.35 | \|f/f3\| | 0.18 |
| T12/(CT1 + CT2) | 2.36 | f1/f2 | 0.85 |
| T12/CT1 | 4.71 | f2/CT2 | −12.47 |
| T23/T34 | 2.63 | f56/f4 | 0.95 |
| T45/T56 | 15.59 | Y11/ImgH | 1.48 |

7th Embodiment

Figure 14:
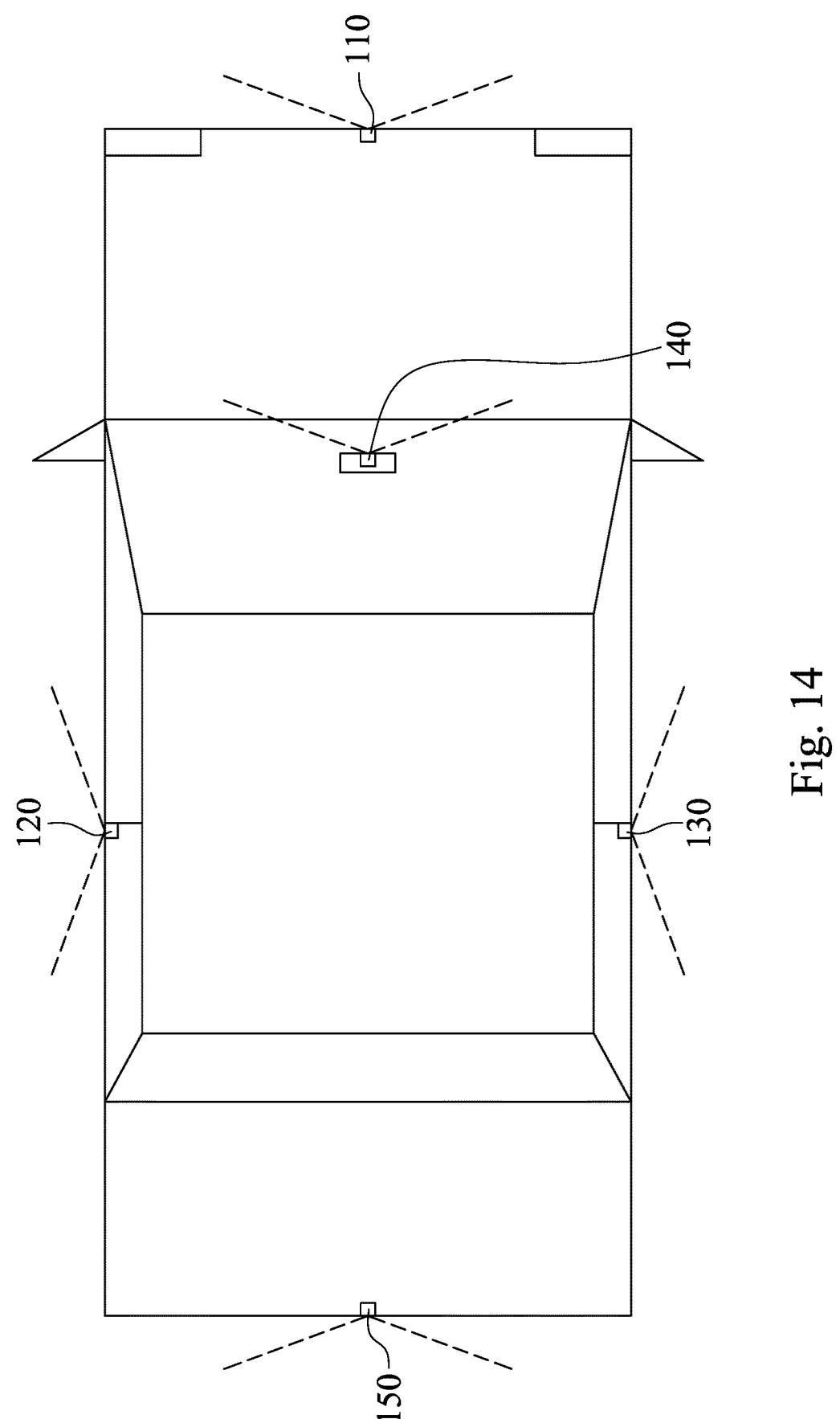
FIG. 14 is a schematic view of a plurality of image apparatuses according to the 7th embodiment of the present disclosure applied to a vehicle.

FIG. 14 is a schematic view of a plurality of image apparatuses 110, 120, 130, 140, 150 according to the 7th embodiment of the present disclosure applied to a vehicle 100. As shown in FIG. 14, the vehicle 100 is equipped with plural image apparatuses 110, 120, 130, 140, 150 of the present disclosure, wherein all of the image apparatuses 110, 120, 130, 140, 150 are wide angle imaging apparatuses, and each of the image apparatuses 110, 120, 130, 140, 150 includes the image lens assembly of the present disclosure (not shown in drawings) and an image sensor (not shown in drawings). The image sensor is disposed on an image surface of the image lens assembly. In detail, the image apparatuses 110, 120, 130, 140, 150 can respectively be any one of the image apparatuses 1, 2, 3, 4, 5, 6 according to the 1st embodiment to the 6th embodiment, but the present disclosure is not limited thereto.

In detail, the image apparatus 110 is disposed on a front side of the vehicle 100, the image apparatuses 120, 130 are respectively disposed on a left side and a right side of the vehicle 100, the image apparatus 140 is disposed inside the vehicle 100 and faces to the front side, and the image apparatus 150 is disposed on a back side of the vehicle 100. Therefore, it can be used to detect the surrounding environment of the vehicle as a reference basis for assisting driving or autonomous driving. It must be noted that the arrangement of the image apparatuses 110, 120, 130, 140, 150 in FIG. 14 according to the 7th embodiment is only for an example, and the number, position and direction thereof can be adjusted according to actual needs. Further, the image apparatus of the present disclosure can be further applied to other devices and is not limited to the vehicle 100 according to the 7th embodiment.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising six lens elements, the six lens elements being, in order from an object side to an image side along an optical path:

a first lens element, a second lens element, a third lens element, a fourth lens element, a fifth lens element and a sixth lens element; each of the six lens elements has an object-side surface towards the object side and an image-side surface towards the image side;

wherein a total number of the lens elements in the image lens assembly is six, the first lens element with negative refractive power has the image-side surface being concave in a paraxial region thereof; the second lens element has negative refractive power; the fourth lens element has the image-side surface being convex in a paraxial region thereof; the fifth lens element has the object-side surface being convex in a paraxial region thereof; the sixth lens element has negative refractive power;

wherein at least one surface of at least one of the six lens elements comprises at least one inflection point;

wherein a focal length of the first lens element is f1, a focal length of the second lens element is f2, an axial distance between the first lens element and the second lens element is T12, an axial distance between the second lens element and the third lens element is T23, an axial distance between the third lens element and the fourth lens element is T34, a central thickness of the first lens element is CT1, a central thickness of the second lens element is CT2, and the following conditions are satisfied:

$$0<f1/f2<2.0;$$

$$1.6<T12/(CT1+CT2); \text{ and}$$

$$1.1<T23/T34<5.0.$$

2. The image lens assembly of claim 1, wherein the focal length of the first lens element is f1, the focal length of the second lens element is f2, and the following condition is satisfied:

$$0.20<f1/f2<1.7.$$

3. The image lens assembly of claim 1, wherein the axial distance between the second lens element and the third lens element is T23, the axial distance between the third lens element and the fourth lens element is T34, and the following condition is satisfied:

$$1.3<T23/T34<4.0.$$

4. The image lens assembly of claim 1, wherein a maximum of refractive indexes of all the lens elements of the image lens assembly is Nmax, the focal length of the second lens element is f2, the central thickness of the second lens element is CT2, and the following conditions are satisfied:

$$1.80<Nmax<2.10; \text{ and}$$

$$-30<f2/CT2<-6.5.$$

5. The image lens assembly of claim 1, wherein the axial distance between the third lens element and the fourth lens element is T34, a central thickness of the third lens element is CT3, a central thickness of the fourth lens element is CT4, a focal length of the image lens assembly is f, a focal length of the third lens element is f3, and the following conditions are satisfied:

$$3.0<(CT3+CT4)/T34<18; \text{ and}$$

$$|f/f3|<0.25.$$

6. The image lens assembly of claim 1, wherein the axial distance between the first lens element and the second lens element is T12, the central thickness of the first lens element is CT1, and the following condition is satisfied:

$$3.6<T12/CT1<6.0.$$

7. The image lens assembly of claim 1, wherein a maximum distance between an optical effective region of the object-side surface of the first lens element and an optical axis is Y11, a maximum image height of the image lens assembly is ImgH, and the following condition is satisfied:

$$1.2<Y11/ImgH<2.0.$$

8. The image lens assembly of claim 1, wherein the object-side surface of the first lens element is convex in a paraxial region thereof, a curvature radius of the object-side surface of the first lens element is R1, a curvature radius of the image-side surface of the first lens element is R2, a curvature radius of the image-side surface of the fourth lens element is R8, a curvature radius of the object-side surface of the fifth lens element is R9, and the following conditions are satisfied:

$$1.0<R1/R2<10; \text{ and}$$

$$-1.6<R8/R9<-0.60.$$

9. The image lens assembly of claim 1, wherein at least one surface of each of at least two of the six lens elements comprises at least one inflection point, an axial distance between the object-side surface of the first lens element and an image surface is TL, an entrance pupil diameter of the image lens assembly is EPD, and the following is satisfied:

$$11.0<TL/EPD<22.0.$$

10. An image apparatus, comprising:
the image lens assembly of claim 1; and
an image sensor disposed on an image surface of the image lens assembly.

11. An image lens assembly comprising six lens elements, the six lens elements being, in order from an object side to an image side along an optical path:
a first lens element, a second lens element, a third lens element, a fourth lens element, a fifth lens element and a sixth lens element; each of the six lens elements has an object-side surface towards the object side and an image-side surface towards the image side;
wherein a total number of the lens elements in the image lens assembly is six, the first lens element with negative refractive power has the image-side surface being concave in a paraxial region thereof; the second lens element with negative refractive power has the image-side surface being concave in a paraxial region thereof; the fourth lens element has positive refractive power; the sixth lens element has the object-side surface being concave in a paraxial region thereof;
wherein at least one surface of at least one of the six lens elements comprises at least one inflection point;
wherein a focal length of the first lens element is f1, a focal length of the second lens element is f2, an axial distance between the first lens element and the second lens element is T12, an axial distance between the second lens element and the third lens element is T23, an axial distance between the third lens element and the fourth lens element is T34, a central thickness of the first lens element is CT1, a central thickness of the second lens element is CT2, and the following conditions are satisfied:

$$0<f1/f2<2.0;$$

$$1.9<T12/(CT1+CT2); \text{ and}$$

$$1.1<T23/T34<5.0.$$

12. The image lens assembly of claim 11, wherein the focal length of the first lens element is f1, the focal length of the second lens element is f2, and the following condition is satisfied:

$$0.20<f1/f2<1.7.$$

13. The image lens assembly of claim 11, wherein the axial distance between the first lens element and the second lens element is T12, the central thickness of the first lens element is CT1, the central thickness of the second lens element is CT2, and the following condition is satisfied:

$$2.1<T12/(CT1+CT2)<3.0.$$

14. The image lens assembly of claim 11, wherein a minimum of refractive indexes of all the lens elements of the image lens assembly is Nmin, a sum of all axial distances between two of the lens elements adjacent thereto of the image lens assembly is ΣAT, a sum of the central thicknesses of all the lens elements of the image lens assembly is ΣCT, a half of a maximum field of view of the image lens assembly is HFOV, and the following conditions are satisfied:

$$1.60 < N\text{min} < 1.70;$$

$$1.1 < \Sigma CT/\Sigma AT < 3.0; \text{ and}$$

$$60.0 \text{ degrees} < HFOV < 110.0 \text{ degrees}.$$

15. The image lens assembly of claim 11, wherein an Abbe number of the third lens element is V3, an Abbe number of the fourth lens element is V4, an Abbe number of the fifth lens element is V5, an Abbe number of the sixth lens element is V6, a focal length of the fourth lens element is f4, a composite focal length of the fifth lens element and the sixth lens element is f56, and the following conditions are satisfied:

$$2.0 < (V4+V5)/(V3+V6) < 4.5; \text{ and}$$

$$0.30 < f56/f4 < 2.0.$$

16. The image lens assembly of claim 11, wherein the central thickness of the first lens element is CT1, the central thickness of the second lens element is CT2, a central thickness of the third lens element is CT3, a central thickness of the fourth lens element is CT4, a central thickness of the fifth lens element is CT5, a central thickness of the sixth lens element is CT6, and the following condition is satisfied:

$$14.0 < (CT2+CT3+CT4+CT5+CT6)/CT1 < 27.0.$$

17. The image lens assembly of claim 11, wherein an axial distance between the object-side surface of the first lens element and an image surface is TL, a maximum image height of the image lens assembly is ImgH, an f-number of the image lens assembly is Fno, and the following conditions are satisfied:

$$4.0 < TL/\text{ImgH} < 7.0; \text{ and}$$

$$1.2 < Fno < 2.0.$$

18. The image lens assembly of claim 11, wherein the fifth lens element has positive refractive power, an axial distance between the fourth lens element and the fifth lens element is T45, an axial distance between the fifth lens element and the sixth lens element is T56, and the following condition is satisfied:

$$1.5 < T45/T56.$$

19. The image lens assembly of claim 11, wherein the image-side surface of the fifth lens element is convex in a paraxial region thereof, a curvature radius of the image-side surface of the fifth lens element is R10, a curvature radius of the object-side surface of the sixth lens element is R11, and the following condition is satisfied:

$$0.80 < R10/R11 < 1.4.$$

20. The image lens assembly of claim 11, wherein at least one lens element of the six lens elements is made of a glass material and has both of the object-side surface and the image-side surface being aspheric, a curvature radius of the image-side surface of the second lens element is R4, the central thickness of the second lens element is CT2, and the following condition is satisfied:

$$4.5 < R4/CT2 < 25.$$

* * * * *